(12) United States Patent
Horishita

(10) Patent No.: US 11,316,590 B2
(45) Date of Patent: Apr. 26, 2022

(54) OPTICAL TRANSMISSION DEVICE, OPTICAL MULTIPLEXER, AND OPTICAL TRANSMISSION METHOD

(71) Applicant: Fujitsu Optical Components Limited, Kawasaki (JP)

(72) Inventor: Masakazu Horishita, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/168,306

(22) Filed: Feb. 5, 2021

(65) Prior Publication Data
US 2021/0328682 A1    Oct. 21, 2021

(30) Foreign Application Priority Data
Apr. 16, 2020   (JP) .............................. JP2020-073730

(51) Int. Cl.
*H04B 10/548*   (2013.01)
*H04J 14/02*    (2006.01)

(52) U.S. Cl.
CPC ............ *H04B 10/548* (2013.01); *H04J 14/02* (2013.01)

(58) Field of Classification Search
CPC .............. H04B 10/548; H04B 10/0777; H04B 2210/074; H04B 10/506; H04B 10/564; H04J 14/02
See application file for complete search history.

(56) References Cited

U.S. PATENT DOCUMENTS

| | | | | |
|---|---|---|---|---|
| 5,654,816 A | * | 8/1997 | Fishman | H04B 10/2933 398/32 |
| 5,737,459 A | * | 4/1998 | Epworth | H01S 5/0687 385/42 |
| 7,369,290 B1 | * | 5/2008 | Cox | G02F 1/225 359/239 |
| 7,499,177 B2 | * | 3/2009 | Katsifolis | G08B 13/186 356/483 |
| 8,953,169 B2 | * | 2/2015 | Lefevre | G01B 9/02055 356/491 |
| 2003/0044101 A1 | * | 3/2003 | Jacobowitz | H04J 14/0212 385/10 |

(Continued)

FOREIGN PATENT DOCUMENTS

| | | |
|---|---|---|
| JP | 2019-106605 | 6/2019 |
| JP | 2019-184844 | 10/2019 |

*Primary Examiner* — Tanya T Motsinger
(74) *Attorney, Agent, or Firm* — Staas & Halsey LLP

(57) ABSTRACT

An optical transmission device includes a first detector, a generator, a second detector, and a controller. The first detector detects optical output power of an optical signal for each channel for input to a Mach-Zehnder unit that has asymmetric optical waveguides. The generator superimposes, based on the detected optical output power for each of the channels, a dither signal onto an optical signal in a specific channel from among the plurality of channels for input to the Mach-Zehnder unit. The second detector detects an amplitude value of the dither signal superimposed onto the optical signal in the specific channel output from the Mach-Zehnder unit. The controller adjusts a phase difference in the Mach-Zehnder unit such that the amplitude value of the dither signal superimposed onto the detected optical signal in the specific channel is less than a predetermined threshold.

9 Claims, 22 Drawing Sheets

(56) References Cited

U.S. PATENT DOCUMENTS

| | | | |
|---|---|---|---|
| 2006/0227401 A1* | 10/2006 | Webb | G02F 1/0123 |
| | | | 359/276 |
| 2007/0133918 A1* | 6/2007 | Cho | H04B 10/2543 |
| | | | 385/3 |
| 2011/0006825 A1* | 1/2011 | Fludger | H04L 27/223 |
| | | | 327/237 |
| 2012/0318965 A1* | 12/2012 | Tosaki | H04B 10/0773 |
| | | | 250/227.11 |
| 2013/0195394 A1* | 8/2013 | Hosokawa | H04B 10/5053 |
| | | | 385/3 |
| 2014/0168741 A1* | 6/2014 | Li | G02F 1/0123 |
| | | | 359/239 |
| 2015/0104195 A1* | 4/2015 | Hu | H04B 10/548 |
| | | | 398/188 |
| 2018/0100967 A1* | 4/2018 | Parker | G02B 6/12004 |
| 2021/0328682 A1* | 10/2021 | Horishita | H04J 14/02 |
| 2021/0336416 A1* | 10/2021 | Yoffe | G02F 1/225 |
| 2021/0364099 A1* | 11/2021 | Ott | F16K 37/0041 |
| 2021/0399806 A1* | 12/2021 | Bernier | H04B 10/503 |
| 2022/0018650 A1* | 1/2022 | Hardman | G01B 9/02041 |
| 2022/0029533 A1* | 1/2022 | Lesso | H03G 3/30 |

\* cited by examiner

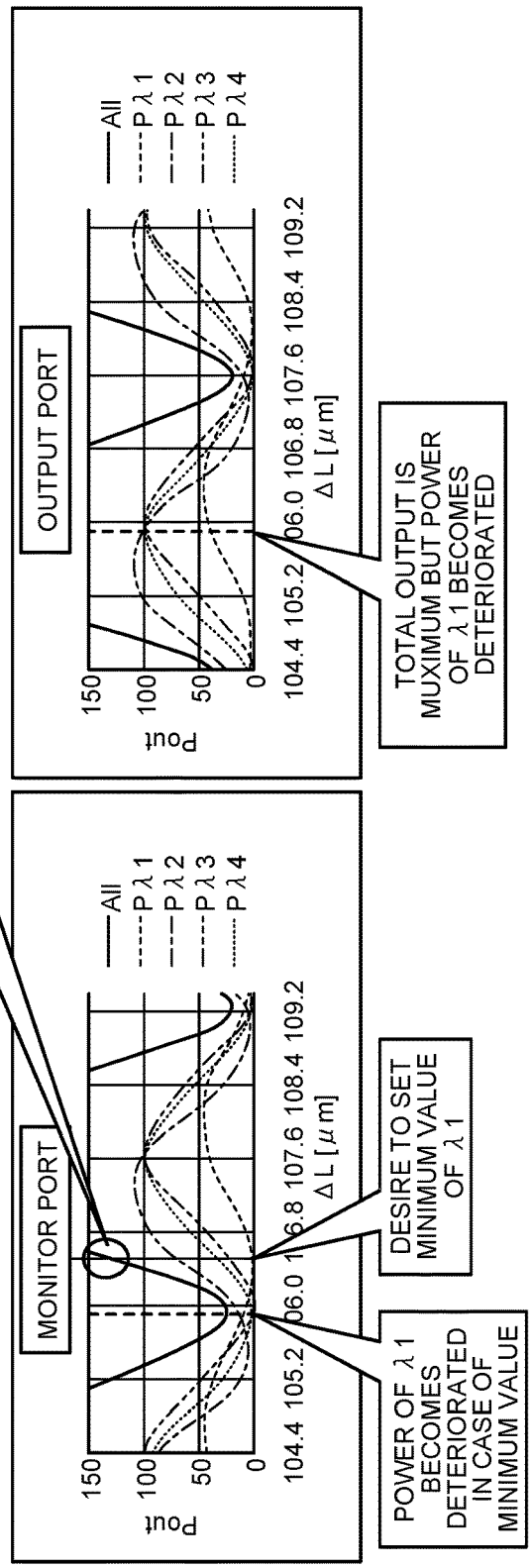

OPTICAL TRANSMISSION DEVICE, OPTICAL MULTIPLEXER, AND OPTICAL TRANSMISSION METHOD

CROSS-REFERENCE TO RELATED APPLICATION

This application is based upon and claims the benefit of priority of the prior Japanese Patent Application No. 2020-073730, filed on Apr. 16, 2020, the entire contents of which are incorporated herein by reference.

FIELD

The embodiments discussed herein are related to an optical transmission device, an optical multiplexer, and an optical transmission method.

BACKGROUND

FIG. 18 is a diagram illustrating an example of a conventional optical transmission device 100. The optical transmission device 100 illustrated in FIG. 18 is, for example, an optical sending device used in an optical wavelength multiplexing system that can multiplex optical signals having four wavelengths. The optical transmission device 100 is constituted by using, for example, three optical multiplexing units having a structure of two-sage cascade connection. The optical transmission device 100 includes four light emitting units 110 and three optical multiplexing units 120. The light emitting units 110 are a first to a fourth light emitting units 110A to 110D emit optical signals at different wavelengths. The optical multiplexing units 120 are a first to a third optical multiplexing units 120A to 120C.

The first optical multiplexing unit 120A multiplexes an optical signal λ1 received from the first emitting unit 110A and an optical signal λ2 received from the second light emitting unit 110B. The second optical multiplexing unit 120B multiplexes an optical signal λ3 received from the third light emitting unit 110C and an optical signal λ4 received from the fourth light emitting unit 110D. The third optical multiplexing unit 120C multiplexes the optical signal λ1+λ2 multiplexed by the first optical multiplexing unit 120A and an optical signal λ3+λ4 multiplexed by the second optical multiplexing unit 120B.

The first optical multiplexing unit 120A includes an input side coupler 121, a Mach-Zehnder unit 122, an output side coupler 123, a delay unit 124, and a control unit 125. The input side coupler 121 multiplexes the optical signal λ1 received from the first light emitting unit 110A and the optical signal λ2 received from the second light emitting unit 110B and outputs the multiplexed optical signal λ1+λ2 to the Mach-Zehnder unit 122. The Mach-Zehnder unit 122 is an asymmetric type Mach-Zehnder interferometer having two optical waveguides with different arm lengths. When the multiplexed optical signal λ1+λ2 passes through each of the two optical waveguides, the Mach-Zehnder unit 122 performs phase adjustment on the multiplexed optical signal λ1+λ2 and outputs the optical signal λ1+λ2 that has been subjected to the phase adjustment to the output side coupler 123. The output side coupler 123 includes an output port 123A that is a forward-direction port and a monitor port 123B that is a reverse-direction port. The output port 123A outputs the optical signal λ1+λ2 that has been subjected to the phase adjustment to the third optical multiplexing unit 120C. The delay unit 124 delays a phase difference in the Mach-Zehnder unit 122, for example, delays the phases of the optical signal passing through the two optical waveguides. The control unit 125 controls the delay unit 124.

The second optical multiplexing unit 120B includes the input side coupler 121, the Mach-Zehnder unit 122, the output side coupler 123, the delay unit 124, and the control unit 125. The input side coupler 121 multiplexes the optical signal λ2 received from the third emitting unit 110C and the optical signal λ4 received from the fourth light emitting unit 110D and outputs the multiplexed optical signal λ3+λ4 to the Mach-Zehnder unit 122. The Mach-Zehnder unit 122 is an asymmetric type Mach-Zehnder interferometer having two optical waveguides with different arm lengths. When the multiplexed optical signal λ3+λ4 passes through each of the two optical waveguides, the Mach-Zehnder unit 122 performs phase adjustment on the multiplexed optical signal λ3+λ4 and outputs the optical signal λ3+λ4 that has been subjected to the phase adjustment to the output side coupler 123. The output side coupler 123 includes the output port 123A that is the forward-direction port and the monitor port 123B that is the reverse-direction port. The output port 123A outputs the optical signal λ3+λ4 that has been subjected to the phase adjustment to the third optical multiplexing unit 120C. The delay unit 124 delays a phase difference of the Mach-Zehnder unit 122, for example, delays the phases of the optical signals passing through the two optical waveguides. The control unit 125 controls the delay unit 124.

The third optical multiplexing unit 120C includes the input side coupler 121, the Mach-Zehnder unit 122, the output side coupler 123, the delay unit 124, the control unit. 125, and an optical monitor 126. The input side coupler 121 multiplexes the optical signal λ1+λ2 received from the first optical multiplexing unit 120A and the optical signal λ3+λ4 received from the second optical multiplexing unit 120B and outputs the multiplexed optical signal λ1+λ2+λ3+λ4 to the Mach-Zehnder unit 122. The Mach-Zehnder unit 122 is an asymmetric type Mach-Zehnder interferometer having two optical waveguides with different arm lengths. When the multiplexed optical signal λ1+λ2+λ3+λ4 passes through each of the two optical waveguides, the Mach-Zehnder unit 122 performs phase adjustment on the multiplexed optical signal λ1+λ2+λ3+λ4 and outputs the optical signal λ1+λ2+λ3+λ4 that has been subjected to the phase adjustment to the output side coupler 123. The output side coupler 123 includes the output port 123A that is the forward-direction port and the monitor port 123B that is the reverse-direction port. The output side coupler 123 connects the output port 123A and an output port 127 and outputs the optical signal λ1+λ2+λ3+λ4 that has been subjected to the phase adjustment to the output port 130. The output side coupler 123 connects the monitor port 123B and the optical monitor 126 and outputs a reverse output of the optical signal to the optical monitor 126. The optical monitor 126 detects optical output power of the optical signal that is the reverse output of the third optical multiplexing unit 120C. The delay unit 124 delays a phase difference of the Mach-Zehnder unit 122, for example, delays the phases of the optical signals passing through the two optical waveguides. The control unit 125 controls the delay unit 124 in order to perform phase adjustment such that the optical output power of the optical signal detected by the optical monitor 126 is the minimum.

In the conventional optical transmission device 100, a phase set point of the delay unit 124 is optimized such that the optical output power of the optical signal at the monitor port 123B included in the third optical multiplexing unit 120C is the minimum even when temperature variations in LD characteristics (wavelengths, etc.) in the light emitting unit 110 is generated due to variations in environmental temperature. Consequently, by optimizing the phase set point, it is possible to stably output optimum optical output power from the output port 123A in the third optical multiplexing unit 120C. Furthermore, All corresponds to the total of the pieces of optical output power of λ1 to λ4 and λx corresponds to the optical output power of λx. A phase set point ΔL that is used for an output characteristic of each of the monitor port 123B and the output port 123A varies in accordance with a material used for the Mach-Zehnder unit 122 or an optical wavelength used for each of the first to the fourth light emitting units 110A to 110D.

Patent Document 1: Japanese Laid-open Patent Publication No. 2019-106605

Patent Document 2: Japanese Laid-open Patent Publication No. 2019-184844

Patent Document 3: U.S. Pat. No. 7,499,177

FIG. 19 is a diagram illustrating an example (ideal case) of an output of each of the output port 123A and the monitor port 123B in the conventional optical transmission device 100. The optical transmission device 100 indicated by FIG. 19 is in an ideal state in which, for example, the wavelength interval of each of the channels λ1 to λ4 is an equal interval (for example, 0.02 μm), and furthermore, the optical output power Pout of each of the channels λ1 to λ4 is the same. In the ideal state, when the phase set point ΔL of the Mach-Zehnder unit 122 is set such that output of the monitor port 123B is the minimum, because a filter loss of each of the channels is the minimum, it is possible to stably output optimum optical output power from the output port 123A.

FIG. 20 is a diagram illustrating an output of each of the output port 123A and the monitor port 123B in the conventional optical transmission device 100. As illustrated in FIG. 20, it is assumed a state in which the wavelength interval of each of the channels λ1 to λ4 is not an equal interval and the output power Pout of each of the channels λ1 to λ4 is different. In this case, when the phase set point ΔL of the Mach-Zehnder unit 122 is set such that an output of the monitor port 123B is the minimum, this depends on the channel (for example, λ2), in which the output power Pout is relatively large. When the phase set point that is in accordance with λ2 is set, the total power of the output port 123A becomes the maximum; however, it is not possible to optimize the optical output power of the channel (for example, λ1) in which the output power Pout is relatively small.

In the conventional optical transmission device 100, there is a need to set each of the channels having different optical output power and wavelength intervals to an optimum phase set point. However, because the optical monitor 126 that can check the optical output power that has passed through the filter is only the total power of multiplexed wavelength, i.e., only the optical output power of the third optical multiplexing unit 120C, it is not possible to identify a specific channel from among all of the channels related to the total power.

Namely, in the conventional optical transmission device 100, the mechanism thereof is not able to adjust a phase difference in the Mach-Zehnder unit 122 such that the optical output power is optimized with respect to a specific channel from among a plurality of channels. Therefore, the actual circumstances are limited to control in which a loss of the total power of all of the multiplexed channels is the minimum. Consequently, if there are part variations, manufacturing variations, or temperature variations, it is not able to perform appropriate control on the specific channel that is to be optimally set from among the plurality of channels, which is one of the causes of degradation of transmission quality due to the variation in optical output power caused by characteristic variations in multiplexers. Namely, it is not possible to stably output the optical output power of the plurality of channels.

SUMMARY

According to an aspect of an embodiment, an optical transmission device includes a first detector, a generator, a second detector and a controller. The first detector detects optical output power of an optical signal for each channel for input to a Mach-Zehnder unit that has asymmetric optical waveguides. The generator superimposes, based on the optical output power for each of the channels detected by the first detector, a dither signal onto an optical signal in a specific channel from among the plurality of channels for input to the Mach-Zehnder unit. The second detector detects an amplitude value of the dither signal that is superimposed onto the optical signal in the specific channel and that is output from the Mach-Zehnder unit. The controller adjusts a phase difference in the Mach-Zehnder unit such that the amplitude value of the dither signal superimposed onto the optical signal in the specific channel detected by the second detector is less than a predetermined threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a diagram illustrating an example of outputs of the output port and the monitor port in the conventional optical transmission device.

DESCRIPTION OF EMBODIMENTS

Preferred embodiments of the present invention will be explained with reference to accompanying drawings. The present invention is not limited to the embodiments. Furthermore, the embodiments described below may also be used in any appropriate combination as long as the embodiments do not conflict with each other.

[a] First Embodiment

Figure 1:
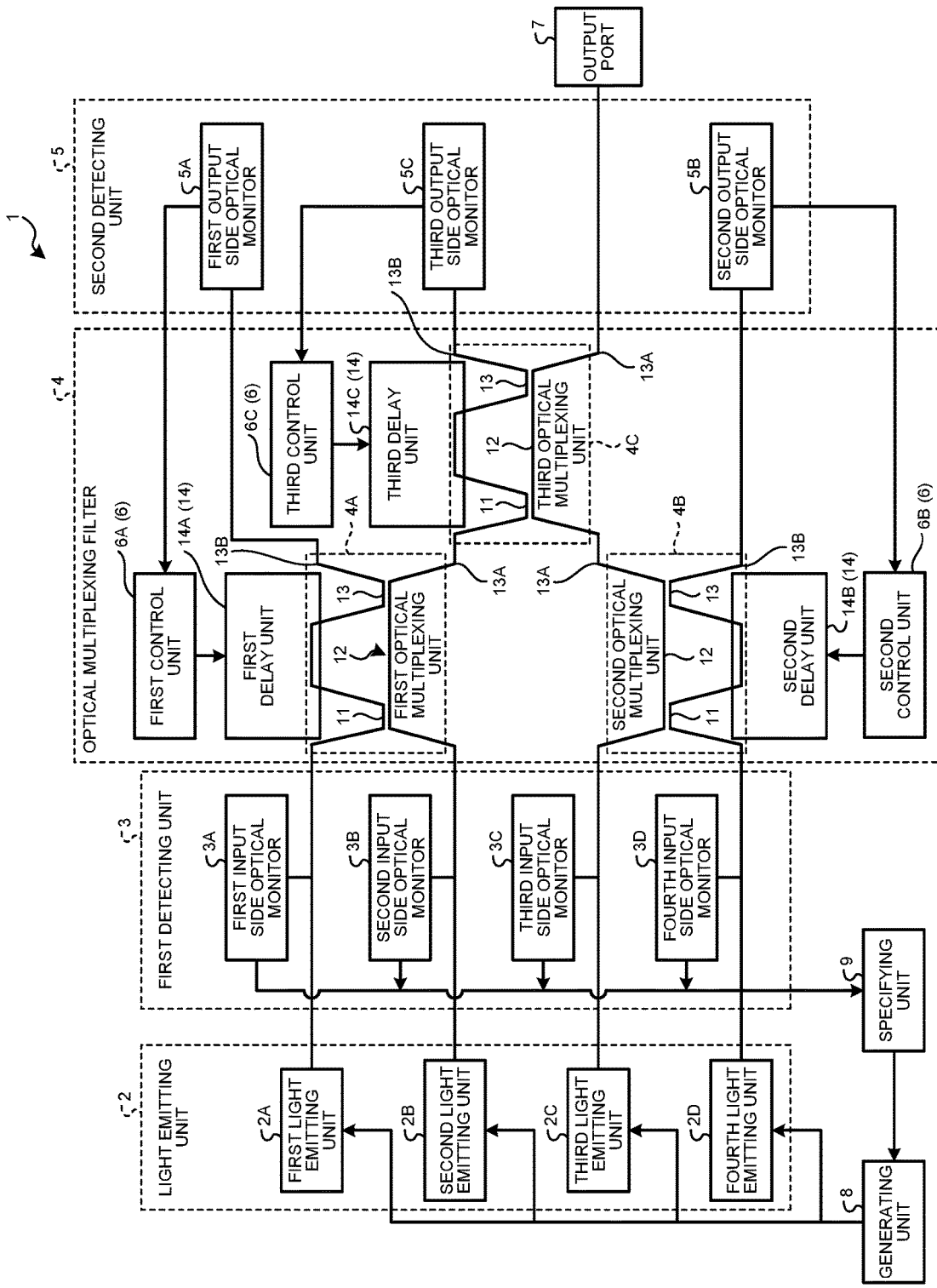
FIG. 1 is a block diagram illustrating an example of an optical transmission device according to a first embodiment.

FIG. 1 is a diagram illustrating an example of an optical transmission device 1 according to a first embodiment. The optical transmission device 1 illustrated in FIG. 1 is an optical sending device used in, for example, an optical wavelength multiplexing system that can multiplex optical signals having four wavelengths. The optical transmission device 1 is constituted by using, for example, three optical multiplexing units having a structure of two-sage cascade connection. The optical transmission device 1 includes a light emitting unit 2 as a light emitter, a first detecting unit 3 as a first detector, an optical multiplexing filter 4, a second detecting unit 5 as a second detector, a control unit 6 as a controller, an output port 7, a generating unit 8 as a generator, and a specifying unit 9 as a processor.

The light emitting unit 2 includes, for example, a first to a fourth light emitting units 2A to 2D that output optical signals associated with channels. The first light emitting unit 2A emits light of the optical signal $\lambda 1$ in a first channel. The second light emitting unit 2B emits light of an optical signal $\lambda 2$ in a second channel. The third light emitting unit 2C emits light of the optical signal $\lambda 3$ in a third channel. The fourth light emitting unit 2D emits light of an optical signal $\lambda 4$ in a fourth channel.

The first detecting unit 3 are, for example, four input side optical monitors that monitor optical output power of the optical signals received from the light emitting unit 2. The first detecting unit 3 are a first to a fourth input side optical monitors 3A to 3D. The first input side optical monitor 3A performs photoelectric conversion on the optical signal $\lambda 1$ associated with the first channel and detects optical output power of the optical signal $\lambda 1$ associated with the first channel. The second input side optical monitor 3B performs photoelectric conversion on the optical signal $\lambda 2$ associated with the second channel and detects optical output power of the optical signal $\lambda 2$ associated with the second channel. The third input side optical monitor 3C performs photoelectric conversion on the optical signal $\lambda 3$ associated with the third channel and detects optical output power of the optical signal $\lambda 3$ associated with the third channel. The fourth input site optical monitor 3D performs photoelectric conversion on the optical signal $\lambda 4$ associated with a fourth channel and detects optical output power of the optical signal $\lambda 4$ associated with the fourth channel.

The optical multiplexing filter 4 is a filter that multiplexes the optical signals $\lambda 1$ to $\lambda 4$ in the first to the fourth channels, respectively, and that outputs the multiplexed optical signal to the output port 7. The optical multiplexing filter 4 includes a first optical multiplexing unit 4A, a second optical multiplexing unit 4B, and a third optical multiplexing unit 4C. The first optical multiplexing unit 4A multiplexes the optical signal $\lambda 1$ associated with the first channel and the optical signal $\lambda 2$ associated with the second channel. The second optical multiplexing unit 4B multiplexes the optical signal $\lambda 3$ associated with the third channel and the optical signal $\lambda 4$ associated with the fourth channel. The third optical multiplexing unit 4C multiplexes the optical signal $\lambda 1+\lambda 2$ multiplexed by the first optical multiplexing unit 4A and the optical signal $\lambda 3+\lambda 4$ multiplexed by the second optical multiplexing unit 4B.

The first optical multiplexing unit 4A includes an input coupler 11, a Mach-Zehnder unit 12, an output coupler 13, and a first delay unit 14A that is a delay unit 14. The input coupler 11 multiplexes the optical signal $\lambda 1$ in the first channel received from the first light emitting unit 2A and the optical signal $\lambda 2$ in the second channel received from the second light emitting unit 2B. The Mach-Zehnder unit 12 is an asymmetric type Mach-Zehnder interferometer having two optical waveguides with different arm lengths. The Mach-Zehnder unit 12 performs phase adjustment on the optical signal $\lambda 1+\lambda 2$ passing through each of the two optical waveguides and outputs the optical signal $\lambda 1+\lambda 2$ that has been subjected to the phase adjustment to the output coupler 13. The output coupler 13 includes an output port 13A that is a forward-direction port and a monitor port 13B that is a reverse-direction port. Furthermore, an output of the output port 13A and an output of the monitor port 13B have a conflicting relationship and, when an output of the output port 13A is the maximum, an output of the monitor port 13B is the minimum. The first delay unit 14A adjusts a phase difference in the Mach-Zehnder unit 12, for example, the phases of the optical signals passing through the two optical waveguides.

The second optical multiplexing unit 4B includes the input coupler 11, the Mach-Zehnder unit 12, the output coupler 13, and a second delay unit 14B that is the delay unit 14. The input coupler 11 multiplexes the optical signal $\lambda 3$ in the third channel received from the third light emitting unit 2C and the optical signal $\lambda 4$ in the fourth channel received from the fourth light emitting unit 2D. The Mach-Zehnder unit 12 is an asymmetric type Mach-Zehnder interferometer having two optical waveguides with different arm lengths. The Mach-Zehnder unit 12 performs phase adjustment on the optical signal $\lambda 3+\lambda 4$ passing through each of the two optical waveguides and outputs the optical signal $\lambda 3+\lambda 4$ that has been subjected to the phase adjustment to the output coupler 13. The output coupler 13 includes the output port 13A and the monitor port 13B. Furthermore, an output of the output port 13A and an output of the monitor port 13B have a conflicting relationship and, when an output of the output port 13A is the maximum, an output of the monitor port 13B is the minimum. The second delay unit 14B adjusts a phase difference in the Mach-Zehnder unit 12, for example, the phases of the optical signals passing through the two optical waveguides.

The third optical multiplexing unit 4C includes the input coupler 11, the Mach-Zehnder unit 12, the output coupler 13, and a third delay unit 14C that is the delay unit 14. The input coupler 11 multiplexes the optical signal $\lambda 1+\lambda 2$ in the first and the second channel multiplexed by the first optical multiplexing unit 4A and the optical signal $\lambda 3+\lambda 4$ in the third and the fourth channel multiplexed by the second optical multiplexing unit 4B. The Mach-Zehnder unit 12 is an asymmetric type Mach-Zehnder interferometer having two optical waveguides with different arm lengths. The Mach-Zehnder unit 12 performs phase adjustment on the optical signal $\lambda 1+\lambda 2+\lambda 3+\lambda 4$ passing through each of the two optical waveguides and outputs the optical signal $\lambda 1+\lambda 2+\lambda 3+\lambda 4$ that has been subjected to the phase adjustment to the output coupler 13. The output coupler 13 includes the output port 13A that is the forward-direction port and the monitor port 13B that is the reverse-direction port. Furthermore, an output of the output port 13A and an output of the monitor port 13B have a conflicting relationship and, when an output of the output port 13A is the maximum, an output of the monitor port 13B is the minimum. The third delay unit 14C adjusts a phase difference in the Mach-Zehnder unit 12, for example, the phases of the optical signals passing through the two optical waveguides.

The second detecting unit 5 includes a first to a third output side optical monitors 5A to 5C. The first output side optical monitor 5A detects optical output power of the optical signal $\lambda 1+\lambda 2$ detected at the monitor port 13B in the first optical multiplexing unit 4A. A second output side optical monitor 5B detects optical output power of the optical signal $\lambda 3+\lambda 4$ detected at the monitor port 13B in the second optical multiplexing unit 4B. The third output side optical monitor 5C detects optical output power of the optical signal $\lambda 1+\lambda 2+\lambda 3+\lambda 4$ detected at the monitor port 13B in the third optical multiplexing unit 4C. The first output side optical monitor 5A is connected to the monitor port 13B of the output coupler 13 included in the first optical multiplexing unit 4A, performs photoelectric conversion on the optical signal $\lambda 1+\lambda 2$ in the first optical multiplexing unit 4A received from the monitor port 13B, and notifies a first control unit 6A of the optical output power of the optical signal $\lambda 1+\lambda 2$. The first control unit 6A controls the first delay unit 14A based on the optical output power received from the first output side optical monitor 5A in order to adjust the phases of the optical signals passing through the two optical wave-guides included in the Mach-Zehnder unit 12 in the first optical multiplexing unit 4A. Furthermore, the first delay unit 14A and the first control unit 6A are, for example, adjusting units.

The second output side optical monitor 5B is connected to the monitor port 13B of the output coupler 13 included in the second optical multiplexing unit 4B, performs photoelectric conversion on the optical signal $\lambda 3+\lambda 4$ in the second optical multiplexing unit 4B received from the monitor port 13B, and notifies the second control unit 6B of the optical output power of the optical signal $\lambda 3+\lambda 4$. The second control unit 6B controls the second delay unit 14B based on the optical output power received from the second output side optical monitor 5B in order to adjust the phases of the optical signals passing through the two optical waveguides included in the Mach-Zehnder unit 12 in the second optical multiplexing unit 4B. Furthermore, the second delay unit 14B and the second control unit 6B are, for example, adjusting units.

The third output side optical monitor 5C is connected to the monitor port 13B of the output coupler 13 included in the third optical multiplexing unit 4C and performs photoelectric conversion on the optical signal $\lambda 1+\lambda 2+\lambda 3+\lambda 4$ in the third optical multiplexing unit 4C received from monitor port 13B. Then, the third output side optical monitor 5C notifies the third control unit 6C of the optical output power of the optical signal $\lambda 1+\lambda 2+\lambda 3+\lambda 4$ that has been subjected to photoelectric conversion. The third control unit 6C controls the third delay unit 14C based on the optical output power received from the third output side optical monitor 5C in order to adjust the phases of the optical signals passing through the two optical waveguides included in the Mach-Zehnder unit 12 in the third optical multiplexing unit 4C. Furthermore, the third delay unit 14C and the third control unit 6C are, for example, adjusting units.

The input coupler 11 included in the third optical multiplexing unit 4C is connected to the output port 13A of the output coupler 13 included in the first optical multiplexing unit 4A and inputs the optical signal $\lambda 1+\lambda 2$ received from the first optical multiplexing unit 4A. Furthermore, the input coupler 11 is connected to the output port 13A in the output coupler 13 included in the second optical multiplexing unit 4B and inputs the optical signal $\lambda 3+\lambda 4$ received from the second optical multiplexing unit 4B. Furthermore, the output coupler 13 included in the third optical multiplexing unit 4C connects the output port 13A and the output port 7 and outputs the optical signal $\lambda 1+\lambda 2+\lambda 3+\lambda 4$ received from the third optical multiplexing unit 4C to the output port 7.

The generating unit 8 generates a dither signal at a low frequency that is superimposed on the optical signal in the setting target channel from among the first to the fourth channels. The specifying unit 9 determines, based on the optical output power of each of the channels that is the monitoring results obtained by the first to the fourth input side optical monitors 3A to 3D, whether the optical output power of the optical signal of each of the first to the fourth channels is large or small and specifies the power order of each of the channels in the order in which the optical output power is small. The specifying unit 9 notifies the generating unit 8, the first to the third phase specifying unit 9, and the first to the third control units 6A to 6C of the power order.

In order to superimpose the dither signal onto the optical signal associated with a specific channel in which the optical output power is the minimum from among the plurality of the channels, the generating unit 8 outputs the dither signal to the light emitting unit 2 associated with the specific channel based on the power order received from the specifying unit 9.

The first output side optical monitor 5A performs photoelectric conversion on the optical signal $\lambda 1+\lambda 2$ received from the monitor port 13B included in the first optical multiplexing unit 4A and notifies the first control unit 6A of the optical output power of the optical signal $\lambda 1+\lambda 2$. The first control unit 6A detects an amplitude value of the dither signal based on the optical output power of the first output side optical monitor 5A and determines whether the amplitude value of the dither signal is less than the target value. Furthermore, the target value is a threshold for identifying the amplitude value of an allowable dither signal. When the amplitude value of the dither signal is not less than the target value, the first control unit 6A controls the first delay unit 14A in order to adjust the phase set point of the Mach-Zehnder unit 12 such that the amplitude value of the dither signal becomes less than the target value, for example, becomes the minimum.

The second output side optical monitor 5B performs photoelectric conversion on the optical signal $\lambda 3+\lambda 4$ received from the monitor port 13B of the second optical multiplexing unit 4B and notifies the second control unit 6B of the optical output power of the optical signal $\lambda 3+\lambda 4$. The second control unit 6B detects the amplitude value of the dither signal from the optical output power of the second output side optical monitor 5B and determines whether the amplitude value of the dither signal is less than the target value. When the amplitude value of the dither signal is not less than the target value, the second control unit 6B controls the second delay unit 14B in order to adjust the phase set point of the Mach-Zehnder unit 12 such that the amplitude value of the dither signal becomes less than the target value, for example, becomes the minimum.

The third output side optical monitor 5C performs photoelectric conversion on the optical signal $\lambda 1+\lambda 2+\lambda 3+\lambda 4$ received from the monitor port 13B of the third optical multiplexing unit 4C and notifies the third control unit 6C of the optical output power of the optical signal $\lambda 1+\lambda 2+\lambda 3+\lambda 4$. The third control unit 6C detects the amplitude value of the dither signal from the optical output power of the third output side optical monitor 5C and determines whether the amplitude value of the dither signal is less than the target value. When the amplitude value of the dither signal is not less than the target value, the third control unit 6C controls the third delay unit 14C in order to adjust the phase set point of the Mach-Zehnder unit 12 such that the amplitude value of the dither signal becomes less than the target value, for example, becomes the minimum.

Figure 2:
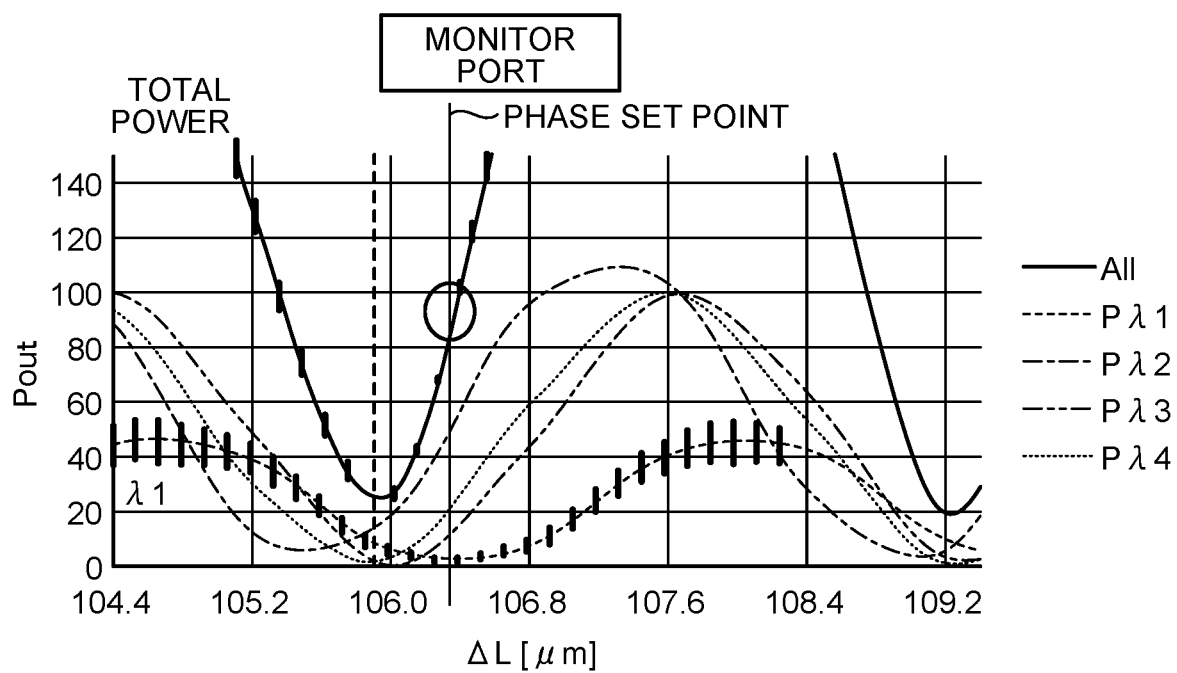
FIG. 2 is a diagram illustrating an example of a relationship between optical output power and a phase set point of each channel.

FIG. 2 is a diagram illustrating an example of a relationship between the optical output power and the phase set point of each of the channels. The diagram illustrated in FIG. 2 illustrates optical output power $P\lambda 1$ of the optical signal $\lambda 1$ in the first channel, optical output power $P\lambda 2$ of the optical signal in the second channel, optical output power $P\lambda 3$ of the optical signal $\lambda 3$ in the third channel, and optical output power $A\lambda 4$ of the optical signal $\lambda 4$ in the fourth channel. Furthermore, FIG. 2 illustrates a total power PA of the first to the fourth channels. It is assumed that the optical output power of the first channel is the minimum from among the first to the fourth channels. The dither signal is superimposed onto the optical signal $\lambda 1$ associated with the first channel. Accordingly, the dither signal is also superimposed onto the total power. Thus, the phase set point that is used to adjust the phase difference of the Mach-Zehnder unit 12 in which the amplitude value of the dither signal included in the total power is the minimum is searched. Then, the control unit 6 sets the phase set point into the delay unit 14, whereby the amplitude value of the dither signal becomes the minimum. Furthermore, All corresponds to the total of the optical output power of $\lambda 1$ to $\lambda 4$ and $\lambda x$ corresponds to the optical output power of $\lambda x$. The phase set point at that is used for an output characteristic varies in accordance with a material used for the Mach-Zehnder unit 12 or an optical wavelength used by each of the first to the fourth light emitting units 2A to 2D.

The optical transmission device 1 superimposes the dither signal onto the setting target channel in which the optical output power is the minimum and controls the delay unit 14 in order to control the phase set point (phase difference) such that the amplitude value of the dither signal associated with the setting target channel is the minimum. Consequently, even when part variations or manufacturing variations are present, it is possible to stabilize the optical output power of each of the channels by appropriately controlling the optical multiplexing filter 4.

In the optical transmission device 1 according to the first embodiment, a dither signal is superimposed onto the setting target channel by focusing on the state in which the amplitude of the dither signal also varies in accordance with the phase set point and the component of the dither signal is also superimposed onto the total power. Then, the optical transmission device 1 detects the amplitude value of the dither signal and sets the phase set point such that the amplitude value of the dither signal at the monitor port 13B is less than the target value. Namely, the optical transmission device 1 adjusts the phase difference of the Mach-Zehnder unit 12 such that the amplitude value of the dither signal is less than the target value. Consequently, the optical output power of the specific channel is optimized from among the plurality of channels. Furthermore, even when part variations or manufacturing variations are generated, it is possible to automatically compensate fluctuations in optical output power generated due to characteristic fluctuations of the optical multiplexer caused by temperature fluctuations or fluctuations over time and it is thus possible to stably output the optical output power. Consequently, it is possible to improve the transmission quality of the optical output signal and prevent degradation of the optical output signal.

Furthermore, in the first embodiment, a description has been given as an example of a case in which the phase set point is set, based on the power order of each of the channels specified by the specifying unit, such that the amplitude value of the dither signal of the optical output power of the specific channel is less than the target value. However, the embodiment is not limited to the power order and it may also be possible to set the phase set point based on the optical output power of each of the channels such that the amplitude value of the dither signal of the optical output power of the specific channel is less than the target value, and furthermore, modifications are possible as needed.

[b] Second Embodiment

Figure 3:
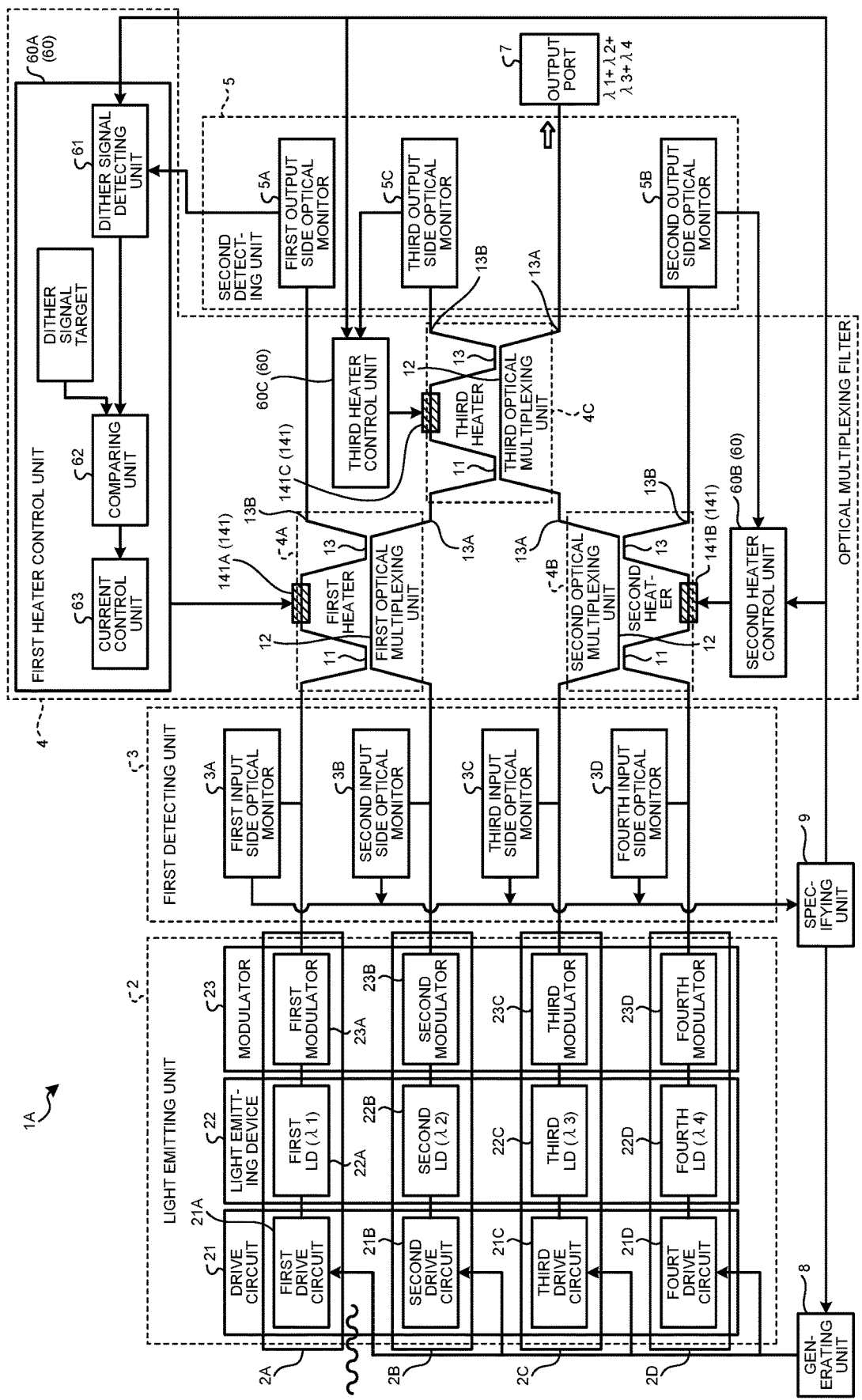
FIG. 3 is a block diagram illustrating an example of an optical transmission device according to a second embodiment.

FIG. 3 is a block diagram illustrating an example of an optical transmission device 1A according to a second embodiment. Furthermore, by assigning the same reference numerals to components having the same configuration as those in the optical transmission device 1 according to the first embodiment, overlapped descriptions of the configuration and the operation thereof will be omitted.

The optical transmission device 1A according to the second embodiment differs from the optical transmission device 1 according to the first embodiment in that a heating unit 141 is arranged instead of the delay unit 14 and a heater control unit 60 is arranged instead of the control unit 6. The light emitting unit 2 illustrated in FIG. 3 includes a drive circuit 21, a light emitting device 22, and a modulator 23. The drive circuit 21 includes a first to a fourth drive circuits 21A to 21D, the light emitting device 22 includes a first to a fourth LDs (laser diodes) 22A to 22D, and the modulator 23 includes a first to a fourth modulators 23A to 23D. The drive circuit 21 includes, for example, an auto current control (ACC) that makes the drive current supplied to the light emitting device 22 constant and an auto power control (APC) that makes a monitor value of the optical output power of light emitted by the light emitting device 22 constant.

The first light emitting unit 2A includes the first drive circuit 21A, the first LD 22A, and the first modulator 23A. The first drive circuit 21A outputs, to the first LD 22A, a first drive current in the first channel that drives the first LD 22A. The first LD 22A emits light of the optical signal $\lambda 1$ in the first channel in accordance with the first drive current received from the first drive circuit 21A. The first modulator 23A modulates the optical signal $\lambda 1$ in the first channel received from the first LD 22A and outputs the modulated optical signal $\lambda 1$ in the first channel.

The second light emitting unit 2B includes the second drive circuit 21B, the second LD 22B, and the second modulator 23B. The second drive circuit 21B outputs, to the second LD 22B, a second drive current in the second channel that drives the second LD 22B. The second LD 22B emits light of the optical signal $\lambda 2$ in the second channel in accordance with the second drive current received from the second drive circuit 21B. The second modulator 23B modulates the optical signal $\lambda 2$ in the second channel received from the second LD 22B and outputs the modulated optical signal $\lambda 2$ in the second channel.

The third light emitting unit 2C includes the third drive circuit 21C, the third LD 22C, and the third modulator 23C. The third drive circuit 21C outputs, to the third LD 22C, a third drive current in the third channel that drives the third LD 22C. The third LD 22C emits light of the optical signal $\lambda 3$ in the third channel in accordance with the third drive current received from the third drive circuit 21C. The third modulator 23C modulates the optical signal $\lambda 3$ in the third channel received from the third LD 22C and outputs the modulated optical signal $\lambda 3$ in the third channel.

The fourth light emitting unit 2D includes the fourth drive circuit 21D, the fourth LD 22D, and the fourth modulator 23D. The fourth drive circuit 21D outputs, to the fourth LD 22D, a fourth drive current of the fourth channel that drives the fourth LD 22D. The fourth LD 22D emits light of the optical signal $\lambda 4$ in the fourth channel in accordance with the fourth drive current received from the fourth drive circuit 21D. The fourth modulator 23D modulates the optical signal $\lambda 4$ in the fourth channel received from the fourth LD 22D and outputs the modulated optical signal $\lambda 4$ in the fourth channel.

The first optical multiplexing unit 4A includes, instead of the first delay unit 14A, a first heater 141A that performs temperature adjustment on the two optical waveguides included in the Mach-Zehnder unit 12. The first heater 141A adjusts, by adjusting the refractive index inside the optical waveguides by the temperature adjustment performed on the two optical waveguides included in the Mach-Zehnder unit 12, the phases of the optical signals passing through, for example, the two optical waveguides.

The second optical multiplexing unit 4B includes, instead of the second delay unit 14B, a second heater 141B that performs temperature adjustment on the two optical waveguides included in the Mach-Zehnder unit 12. The second heater 141B adjusts, by adjusting the refractive index inside the optical waveguides by the temperature adjustment performed on the two optical waveguides included in the Mach-Zehnder unit 12, the phases of the optical signals passing through, for example, the two optical waveguides.

The third optical multiplexing unit 4C includes, instead of the third delay unit 14C, a third heater 141C that performs temperature adjustment on the two optical waveguides included in the Mach-Zehnder unit 12. The third heater 141C adjusts, by adjusting the refractive index inside the optical waveguides by the temperature adjustment performed on the two optical waveguides included in the Mach-Zehnder unit 12, the phases of the optical signals passing through, for example, the two optical waveguides.

The first heater control unit 60A controls the heater current flowing to the first heater 141A based on the optical output power of the optical signal $\lambda 1+\lambda 2$ detected by the first output side optical monitor 5A. The first heater control unit 60A includes a dither signal detecting unit 61, a comparing unit 62, and a current control unit 63. The dither signal detecting unit 61 detects an amplitude value of the dither signal from the optical output power of the optical signal $\lambda 1+\lambda 2$ detected by the first output side optical monitor 5A by using, for example, a Fourier transform. The comparing unit 62 compares the amplitude value of the dither signal detected by the dither signal detecting unit 61 with the target value of the dither signal and determines whether the amplitude value is less than the target value. When the amplitude value is not less than the target value, the current control unit 63 adjusts, based on the comparison result obtained by the comparing unit 62, the heater current (phase set point) flowing to the first heater 141A such that the amplitude value of the dither signal is less than the target value. Namely, the first heater control unit 60A adjusts the phase difference in the Mach-Zehnder unit 12 such that the amplitude value of the dither signal is less than the target value. Furthermore, because the adjustment is performed in order to suppress a fluctuation due to an environmental temperature, the time constant may be relatively slow, such as 100 milliseconds.

The second heater control unit 60B controls the heater current flowing to the second heater 141B based on the optical output power of the optical signal $\lambda 3+\lambda 4$ detected by the second output side optical monitor 5B. The second heater control unit 60B includes the dither signal detecting unit 61, the comparing unit 62, and the current control unit 63. The dither signal detecting unit 61 detects an amplitude value of the dither signal from the optical output power of the optical signal $\lambda 3+\lambda 4$ detected by the second output side optical monitor 5B by using, for example, a Fourier transform. The comparing unit 62 compares the amplitude value of the dither signal detected by the dither signal detecting unit 61 with the target value of the dither signal and determines whether the amplitude value is less than the target value. When the amplitude value is not less than the target value, the current control unit 63 adjusts, based on the comparison result obtained by the comparing unit 62, the heater current (phase set point) flowing to the second heater 141B such that the amplitude value of the dither signal is less than the target value. Namely, the second heater control unit 60B adjusts the phase difference in the Mach-Zehnder unit 12 such that the amplitude value of the dither signal is less than the target value. Furthermore, because the adjustment is performed in order to suppress a fluctuation due to an environmental temperature, the time constant may be relatively slow, such as 100 milliseconds.

The third heater control unit 60C controls the heater current flowing to the third heater 141C based on the optical output power of the optical signal $\lambda 1+\lambda 2+\lambda 3+\lambda 4$ detected by the third output side optical monitor 5C. The third heater control unit 601 includes the dither signal detecting unit 61, the comparing unit 62, and the current control unit 63. The dither signal detecting unit 61 detects a dither signal from the optical output power of the optical signal $\lambda 1+\lambda 2+\lambda 3+\lambda 4$ detected by the third output side optical monitor 5C by using, for example, a Fourier transform. The comparing unit 62 compares the amplitude value of the dither signal detected by the dither signal detecting unit 61 with the target value of the dither signal and determines whether the amplitude value is less than the target value. When the amplitude value is not less than the target value, the current control unit 63 adjusts, based on the comparison result obtained by the comparing unit 62, the heater current (phase set point) flowing to the third heater 141C such that the amplitude value of the dither signal is less than the target value. Namely, the third heater control unit 60C adjusts the phase difference in the Mach-Zehnder unit 12 such that the amplitude value of the dither signal is less than the target value. Furthermore, because the adjustment is performed in order to suppress a fluctuation due to an environmental temperature, the time constant may be relatively slow, such as 100 milliseconds.

In order to superimpose the dither signal onto the optical signal in a specific channel in which the optical output power is the minimum from among the plurality of channels, the generating unit 8 outputs the dither signal to the drive circuit 21 associated with the specific channel based on the power order received from the specifying unit 9.

Figure 4:
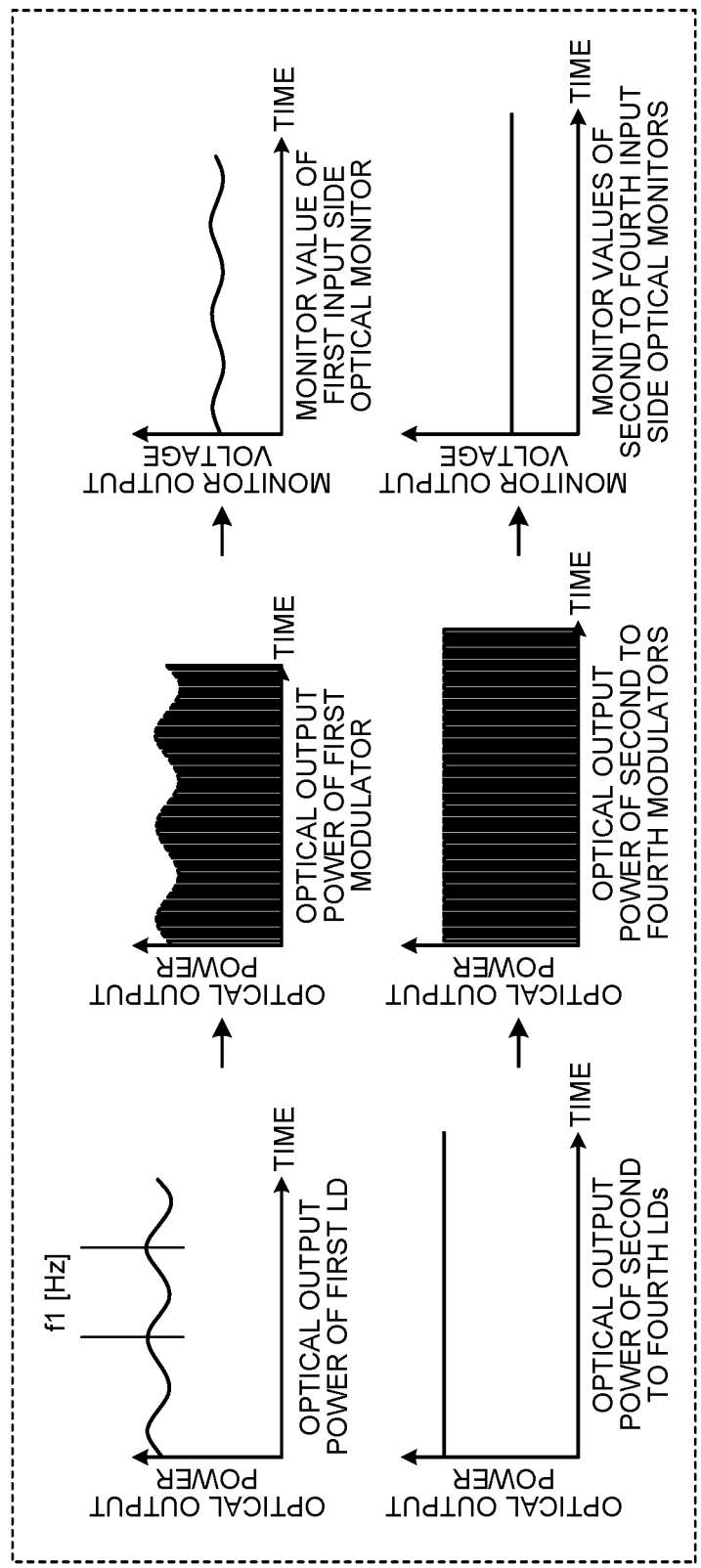
FIG. 4 is a diagram illustrating an example of a comparison of an output of each of a light emitting device, a modulator, and a first detecting unit.

FIG. 4 is a diagram illustrating an example of a comparison of each of the outputs in the light emitting device 22, the modulator 23, and the first detecting unit 3. Furthermore, for convenience of description, it is assumed that the specifying unit 9 specifies, based on the optical output power of each of the channels in the first detecting unit 3, the power order in which the first channel is the highest level because the optical output power of the optical signal $\lambda 1$ in the first channel is the minimum. Then, the generating unit 8 superimposes the dither signal onto the first drive current of the first drive circuit 21A associated with the first channel.

In the first LD 22A, fluctuations in a frequency f1 occur in the optical output power of the optical signal $\lambda 1$ in accordance with the superimposed dither signal. In also the first modulator 23A, fluctuations in the frequency f1 occur in the optical output power of the optical signal $\lambda 1$ in accordance with the superimpose dither signal. In also the first input side optical monitor 3A, fluctuations in the frequency f1 occur in the optical output power of the optical signal $\lambda 1$ in accordance with the superimposed dither signal.

In contrast, in the second to the fourth LDs 22B to 22D, because the dither signal is not superimposed, the optical output power of the optical signal is stable in a constant state. In also the second to the fourth modulators 23B to 23D, because the dither signal is not superimposed, the optical output power of the optical signal is stable in a constant state. In also the second to the fourth input side optical monitors 3B to 3D, because the dither signal is not superimposed, the optical output power of the optical signal stable in a constant state.

Figure 5:
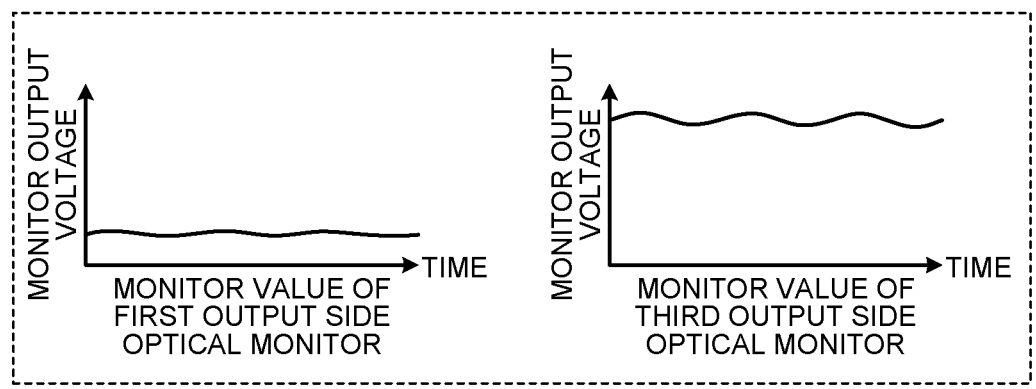
FIG. 5 is a diagram illustrating an example of a comparison of each output in a second detecting unit.

FIG. 5 is a diagram illustrating a comparison of each of the outputs in the second detecting unit 5. In the first output side optical monitor 5A, fluctuations in the frequency f1 occur in the optical output power of the optical signal $\lambda 1+\lambda 2$ received from the first optical multiplexing unit 4A in accordance with the superimposed dither signal. Furthermore, in also the third output side optical monitor 5C, fluctuations in the frequency f1 occur in the optical output power of the optical signal $\lambda 1+\lambda 2+\lambda 3+\lambda 4$ received from the third optical multiplexing unit 4C in accordance with the superimposed dither signal. In contrast, in the second output side optical monitor 5B, because the dither signal is not superimposed, the optical output power of the optical signal $\lambda 3+\lambda 4$ received from the second optical multiplexing unit 4B is stable in a constant state.

Figure 6:
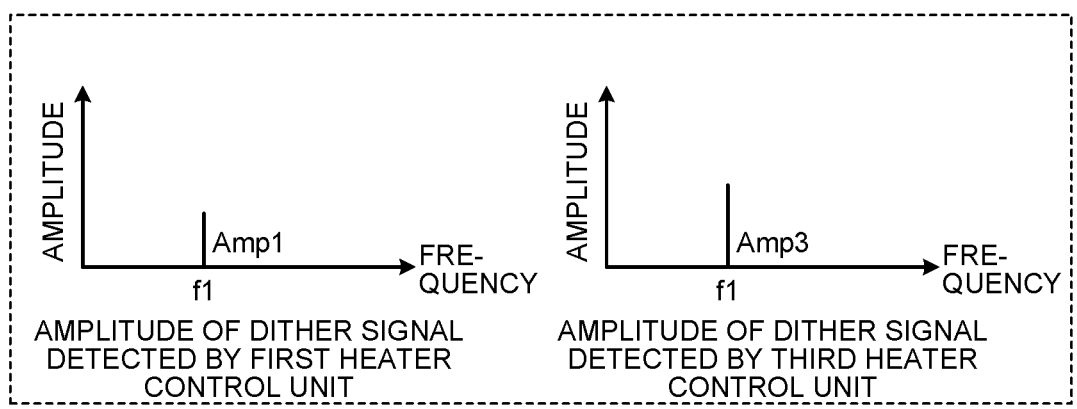
FIG. 6 is a diagram illustrating an example of a comparison of an output of a dither signal detecting unit included in each heater control unit.

FIG. 6 is a diagram illustrating an example of a comparison of an output of the dither signal detecting unit 61 included in each of the heater control units 60. The dither signal detecting unit 61 included in the first heater control unit 60A detects, because the dither signal is superimposed onto the optical signal in the first channel, an amplitude value Amp1 of the dither signal based on the optical output power detected by the first output side optical monitor 5A. Furthermore, the dither signal detecting unit 61 included in the third heater control unit 60C also detects, because the dither signal is superimposed onto the optical signal $\lambda 1$ in the first channel, an amplitude value Amp3 of the dither signal based on the optical output power detected by the third output side optical monitor 5C. In contrast, because the dither signal is not superimposed onto the optical signal in each of the third channel and the fourth channel, the dither signal detecting unit 61 included in the second heater control unit 60B does not detect the amplitude value of the dither signal based on the optical output power detected by the second output side optical monitor 5B.

Figure 7A:
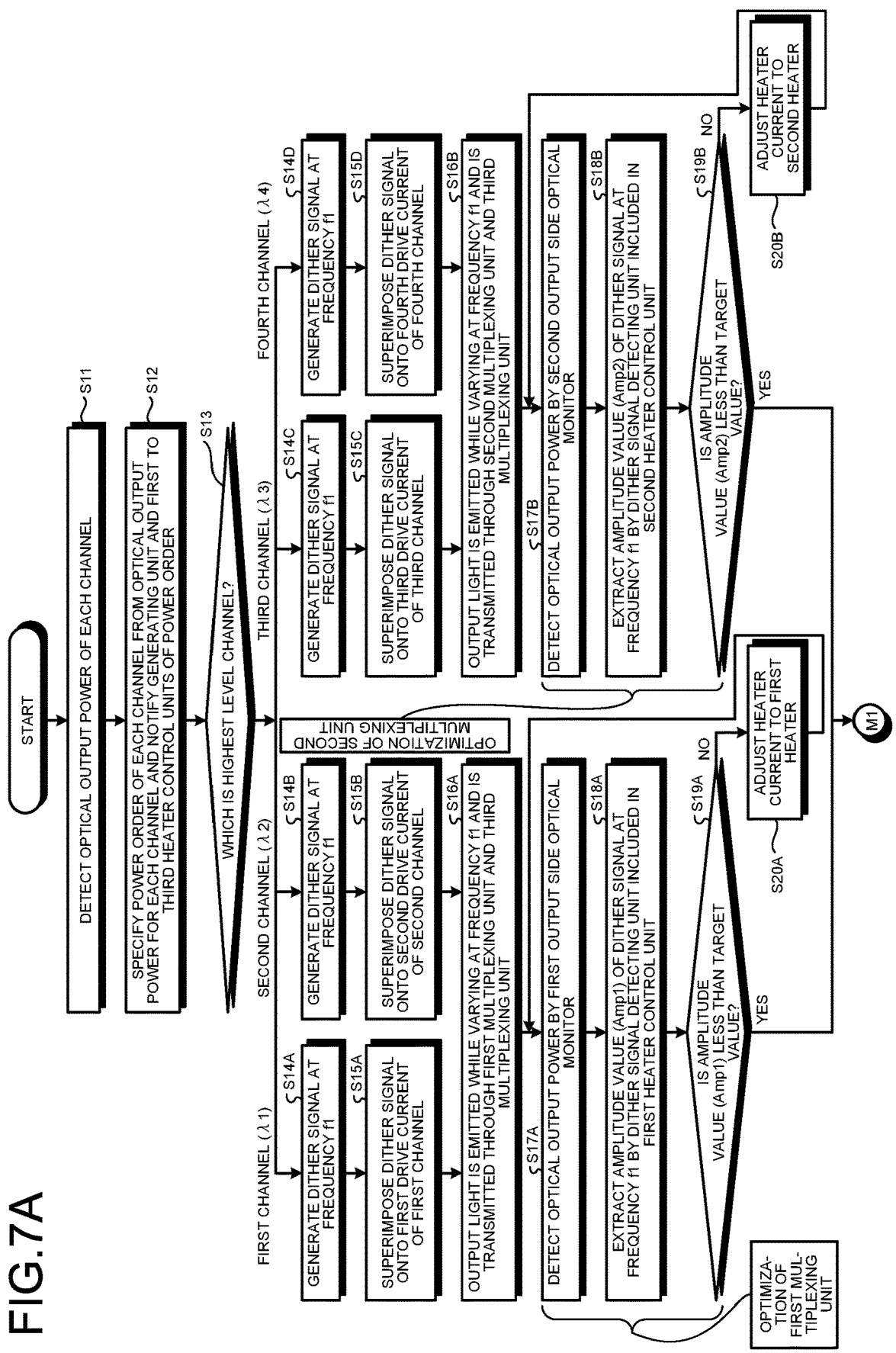
FIG. 7A is a flowchart illustrating an example of a processing operation of the optical transmission device related to a first optimization process.
Figure 7B:
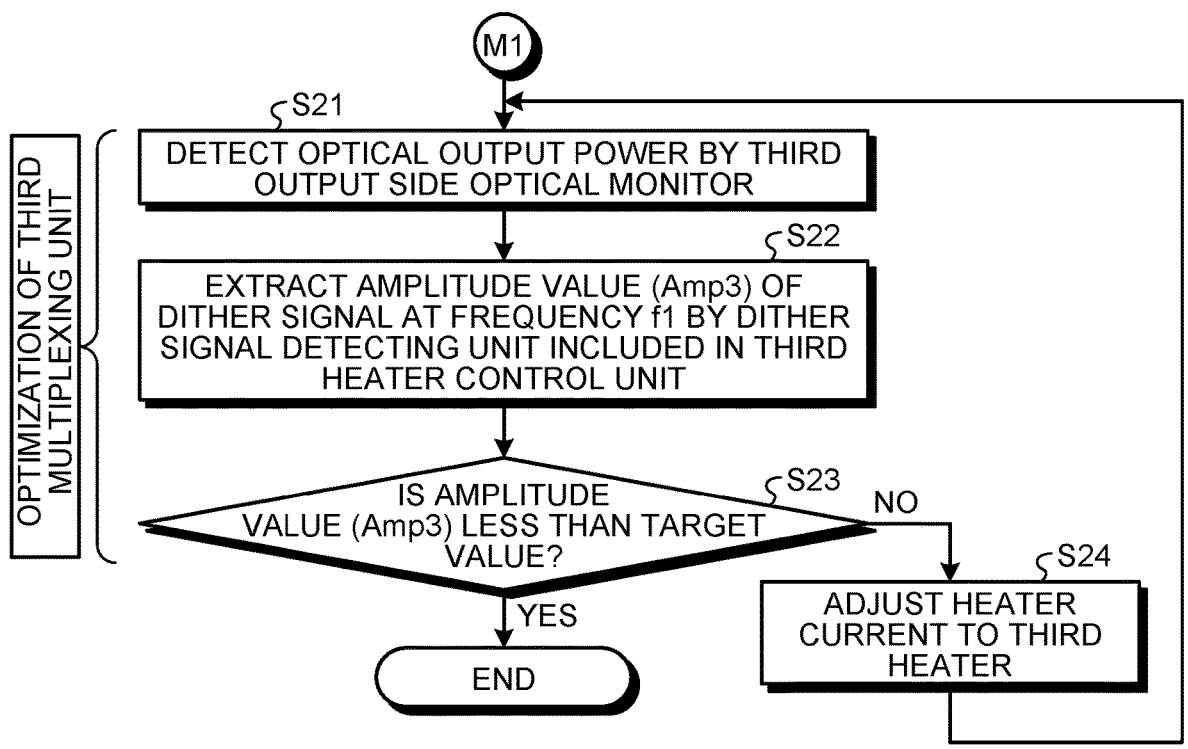
FIG. 7B is a flowchart illustrating an example of a processing operation of the optical transmission device related to the first optimization process.

FIG. 7A and FIG. 7B are flowcharts each illustrating an example of a processing operation of the optical transmission device 1A related to a first optimization process. In FIG. 7A, the first detecting unit 3 included in the optical transmission device 1A detects the optical output power of the optical signal in each of the first to the fourth channels by way of the first to the fourth input side optical monitors 3A to 3D (Step S11). The specifying unit 9 specifies, based on the magnitude of the optical output power in each of the first to the fourth channels, the power order for each channel and notifies the generating unit 8 and the first to the third heater control units 60A to 60C of the power order (Step S12). Furthermore, it is assumed that the power order is set such that the channel in which the optical output power is the minimum is the highest level and the channel in which the optical output power is the maximum is the lowest level.

The generating unit 8 determines the channel having the highest level based on the power order received from the specifying unit 9 (Step S13). When the channel having the highest level is the first channel, i.e., when a specific channel in which the optical output power is the minimum is the first channel, the generating unit 8 generates the dither signal at the frequency f1 (Step S14A). The first drive circuit 21A superimposes the dither signal at the frequency f1 onto the first drive current associated with the first channel (Step S15A). Consequently, the first LD 22A emits light of the optical signal $\lambda 1$ in the first channel in accordance with the first drive current in which the dither signal is superimposed.

The first optical multiplexing unit 4A outputs and transmits the fluctuated optical signal $\lambda 1+\lambda 2$ at the frequency f1 and the third optical multiplexing unit 4C also outputs and transmits the fluctuated optical signal $\lambda 1+\lambda 2+\lambda 3+\lambda 4$ at the frequency f1 (Step S16A). The first output side optical monitor 5A detects the optical output power of the optical signal $\lambda 1+\lambda 2$ output from the monitor port 13B of the first optical multiplexing unit 4A (Step S17A). The dither signal detecting unit 61 included in the first heater control unit 60A extracts the amplitude value of the dither signal at the frequency f1 from the optical output power of the optical signal $\lambda 1+\lambda 2$ detected by the first output side optical monitor 5A (Step S18A). The comparing unit 62 included in the first heater control unit 60A compares the amplitude value extracted at Step S18A with the target value and determines whether the amplitude value is less than the target value (Step S19A).

When the amplitude value is not the target value (No at Step S19A), the current control unit 63 included in the first heater control unit 60A adjusts the heater current (phase set point) flowing to the first heater 141A such that the amplitude value of the dither signal is less than the target value (Step S20A). Namely, the first heater control unit 60A adjusts the phase difference in the Mach-Zehnder unit 12 such that the amplitude value of the dither signal is less than the target value. Then, the first output side optical monitor 5A moves to Step S17A in order to monitor the optical output power received from the first optical multiplexing unit 4A. When the amplitude value of the dither signal in the first heater control unit 60A is less than the target value (Yes at Step S19A), the first output side optical monitor 5A moves to M1 illustrated in FIG. 7B.

Furthermore, when the channel having the highest level is the second channel at Step S13, i.e., when a specific channel having the minimum optical output power is the second channel, the generating unit 8 generates a dither signal at the frequency f1 (Step S14B). The second drive circuit 21B superimposes the dither signal at the frequency f1 onto the second drive current associated with the second channel (Step S15B). Consequently, the second LD 22B emits light of the optical signal λ2 associated with the second channel in accordance with the second drive current in which the dither signal is superimposed. Consequently, the first optical multiplexing unit 4A outputs and transmits the fluctuated optical signal λ1+λ2 at the frequency f1 and the third optical multiplexing unit 4C moves to Step S16A in order to also output and transmit the fluctuated optical signal λ1+λ2+λ3+λ4 at the frequency f1.

When the channel having the highest level is the third channel at Step S13, i.e., when a specific channel having the minimum optical output power is the third channel, the generating unit 8 generates the dither signal at the frequency f1 (Step S14C). The third drive circuit 21C superimposes the dither signal at the frequency f1 onto the third drive current associated with the third channel (Step S15C). Consequently, the third LD 22C emits light of the optical signal λ3 associated with the third channel in accordance with the third drive current in which the dither signal is superimposed.

The second optical multiplexing unit 4B outputs and transmits the fluctuated optical signal λ3+λ4 at the frequency f1 and the third optical multiplexing unit 4C also outputs and transmits the fluctuated optical signal λ1+λ2+λ3+λ4 at the frequency f1 (Step S163). The second output side optical monitor 5B detects the optical output power of the optical signal λ3+λ4 output from the monitor port 13B of the second optical multiplexing unit 4B (Step S17B). The dither signal detecting unit 61 included in the second heater control unit 60B extracts the amplitude value of the dither signal at the frequency f1 from the optical output power of the optical signal λ3+λ4 detected by the second output side optical monitor 5B (Step S18B). The comparing unit 62 included in the second heater control unit 60B compares the amplitude value extracted at Step S18B with the target value and determines whether the amplitude value is less than the target value (Step S19B).

When the amplitude value is not less than the target value (No at Step S19B), the current control unit 63 included in the second heater control unit 60B adjusts the heater current (phase set point) flowing to the second heater 141B such that the amplitude value of the dither signal is less than the target value (Step S20B). Namely, the second heater control unit 60B adjusts the phase difference in the Mach-Zehnder unit 12 such that the amplitude value of the dither signal is less than the target value. Then, the second output side optical monitor 5B moves to Step S17B in order to monitor the optical output power of the optical signal λ3+λ4 received from the second optical multiplexing unit 4B. When the amplitude value of the dither signal included in the second heater control unit 60B is less than the target value (Yes at Step S19B), the second output side optical monitor 5B moves to M1 illustrated in FIG. 7B.

Furthermore, when the channel having the highest level is the fourth channel at Step S13, i.e., when a specific channel having the minimum optical output power is the third channel, the generating unit 8 generates a dither signal at the frequency f1 (Step S14D). The fourth drive circuit 21D superimposes the dither signal at the frequency f1 onto the fourth drive current associated with the fourth channel (Step S15D). Consequently, the fourth LD 22D emits light of the optical signal λ4 in the fourth channel in accordance with the fourth drive current in which the dither signal is superimposed. Consequently, the second optical multiplexing unit 4B outputs and transmits the fluctuated optical signal λ3+λ4 at the frequency f1 and the third optical multiplexing unit 4C moves to Step S16B in order to also output and transmit the fluctuated optical signal λ1+λ2+λ3+λ4 at the frequency f1.

When the amplitude value of the dither signal in the first heater control unit 60A is less than the target value (Yes at Step S19A), the third output side optical monitor 5C detects the optical output power of the optical signal λ1+λ2+λ3+λ4 that is output from the monitor port 13B of the third optical multiplexing unit 4C (Step S21). When the amplitude value of the dither signal in the second heater control unit 60B is less than the target value (Yes at Step S19), the third output side optical monitor 5C moves to Step S21.

The dither signal detecting unit 61 included in the third heater control unit 60C extracts the amplitude value of the dither signal at the frequency f1 from the optical output power detected by the third output side optical monitor 5C (Step S22). The comparing unit 62 included in the third heater control unit 60C compares the amplitude value extracted at Step S22 with the target value and determines whether the amplitude value is less than the target value (Step S23).

When the amplitude value is not less than the target value (No at Step S23), the current control unit 63 included in the third heater control unit 60C adjusts the heater current (phase set point) to the third heater 141C such that the amplitude value of the dither signal is less than the target value (Step S24). Namely the third heater control unit 60C adjusts the phase difference in the Mach-Zehnder unit 12 such that the amplitude value of the dither signal is less than the target value. Then, the third output side optical monitor 5C moves to Step S21 in order to monitor the optical output power received from the third optical multiplexing unit 4C. When the amplitude value of the dither signal in the third heater control unit 60C is less than the target value (Yes at Step S23), the comparing unit 62 included in the third heater control unit 60C ends the optimization process illustrated in FIG. 7B.

The optical transmission device 1A according to the second embodiment superimposes the dither signal onto the setting target channel in which the optical output power is the minimum and adjusts the heater current (phase set point) flowing to the heater 141 associated with the setting target channel such that the amplitude value of the dither signal in the setting target channel is less than the target value. Namely, the optical transmission device 1A adjusts the phase difference in the Mach-Zehnder unit 12 such that the amplitude value of the dither signal is less than the target value.

Consequently, by adjusting the temperature of the heater 141 associated with the setting target channel and by adjusting the refractive index of each of the optical waveguides included in the Mach-Zehnder unit 12, it is possible to stabilize the optical output power of each of the channel by appropriately controlling the optical multiplexing filter 4 even when part variations or manufacturing variations are present.

Furthermore, regarding the optical transmission device 1A according to the second embodiment, a description has been given as an example of a case in which the dither signal is superimposed onto the drive current that drives the light emitting device 22. However, because the drive circuit 21 uses the APC or ACC system, when the dither signal is superimposed onto the optical signal that is to be monitored, there may be a case in which controlling performed by using the APC or ACC system is affected by the dither signal. Thus, in order to cope with this situation, it may also be possible to input a dither signal to the modulator 23 instead of the drive circuit 21, and the embodiment thereof will be described below as a third embodiment.

[c] Third Embodiment

Figure 8:
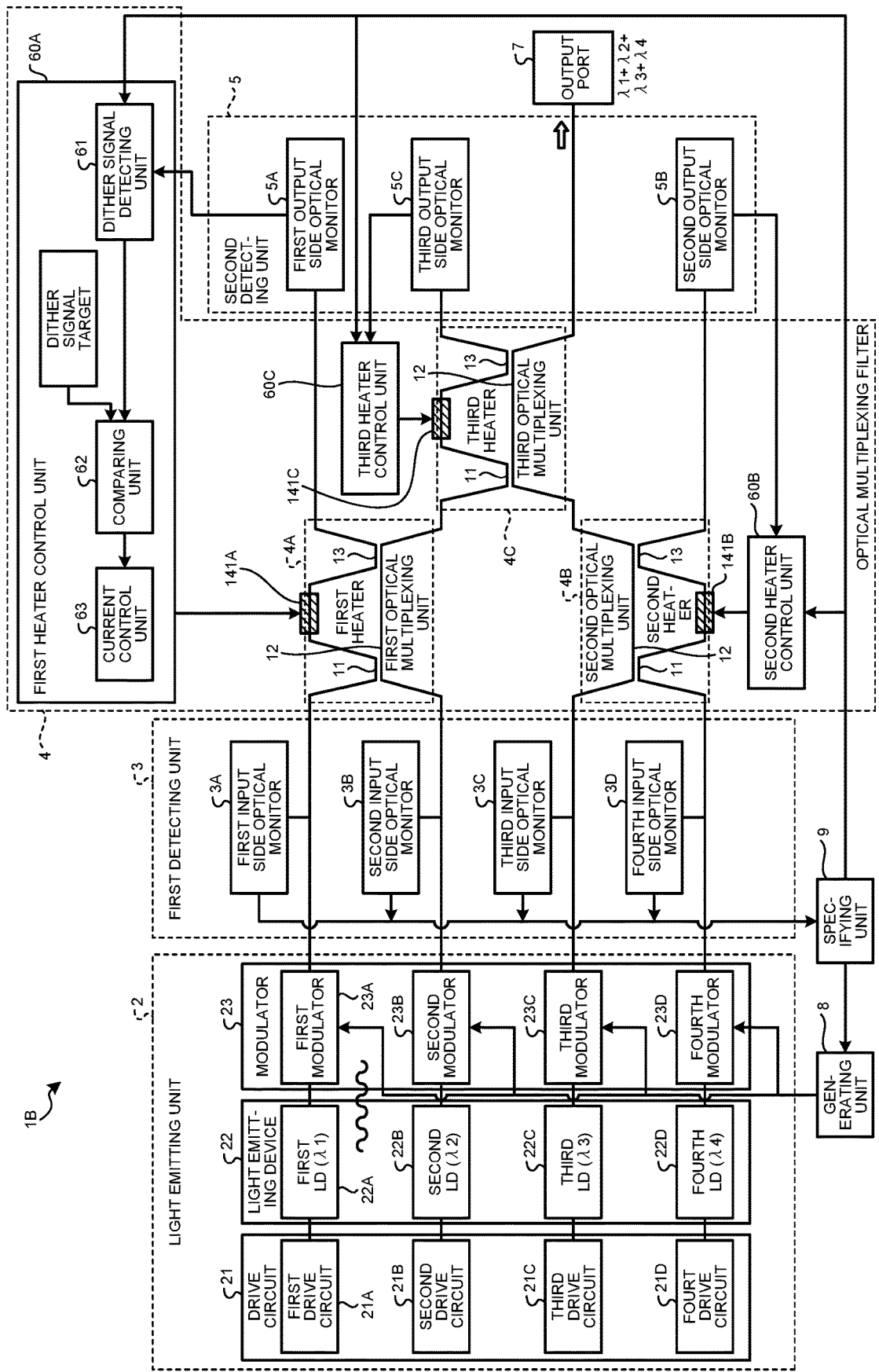
FIG. 8 is a block diagram illustrating an example of an optical transmission device according to a third embodiment.

FIG. 8 is a block diagram illustrating an example of an optical transmission device 1B according to the third embodiment. Furthermore, by assigning the same reference numerals to components having the same configuration as those in the optical transmission device 1A according to the second embodiment, overlapped descriptions of the configuration and the operation thereof will be omitted.

The optical transmission device 1B according to the third embodiment differs from the optical transmission device 1A according to the second embodiment in that, instead of inputting the dither signal generated by the generating unit 8 to the drive circuit 21 associated with the setting target channel, the dither signal generated by the generating unit 8 is input to the modulator 23 associated with the setting target channel.

In order to superimpose the dither signal onto the optical signal associated with a specific channel in which the optical output power is the minimum from among the plurality of channels, the generating unit 8 outputs the dither signal to the modulator 23 associated with the specific channel based on the power order received from the specifying unit 9.

Figure 9:
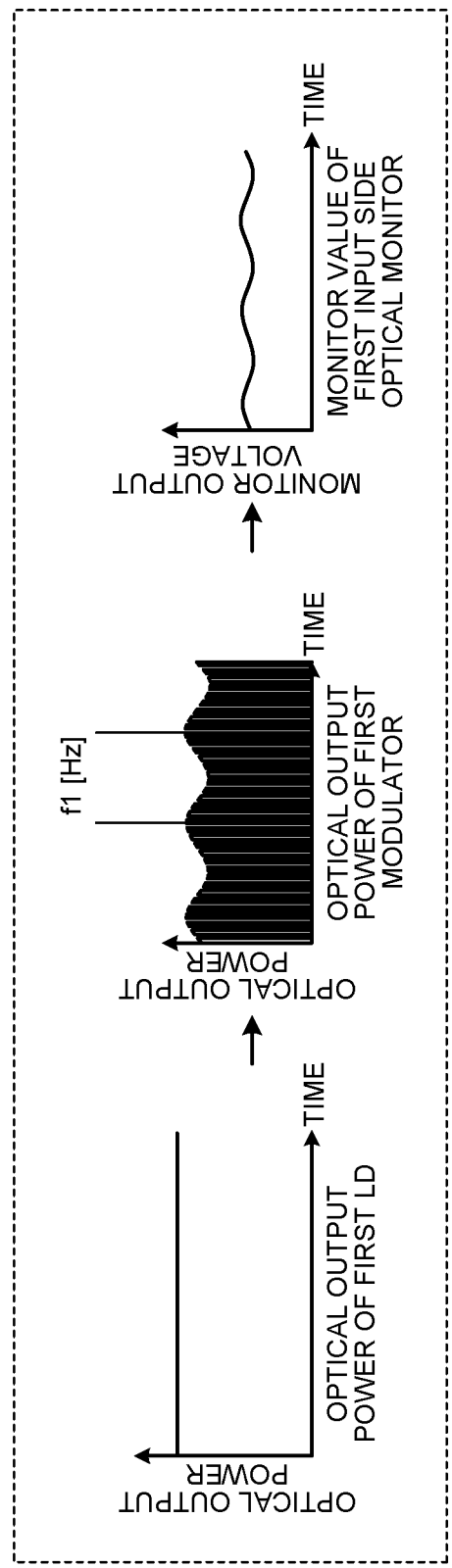
FIG. 9 is a diagram illustrating an example of an output or each or a first LD, a first modulator, and a first input side optical monitor associated with a setting target channel.

FIG. 9 is a diagram illustrating an example of each of the outputs in the first LD 22A, the first modulator 23A, and the first input side optical monitor 3A associated with the setting target channel. Furthermore, for convenience of description, it is assumed that the specifying unit 9 specifies, based on the optical output power of each of the channels in the first detecting unit 3, the power order in which the first channel is the highest level because the optical output power of the optical signal λ1 associated with the first channel is the minimum. Furthermore, it is assumed that the generating unit 8 superimposes the dither signal onto the modulated optical signal λ1 in the first modulator 23A associated with the first channel.

Because the dither signal is not superimposed, the optical output power of the optical signal λ1 is stable in a constant state in the first LD 22A. However, in the first modulator 23A, fluctuations in the frequency f1 occur in the optical output power of the optical signal λ1 in accordance with the superimposed dither signal. In also the first input side optical monitor 3A, fluctuations in the frequency f1 occur in the optical output power of the optical signal λ1 in accordance with the superimposed dither signal.

Figure 10:
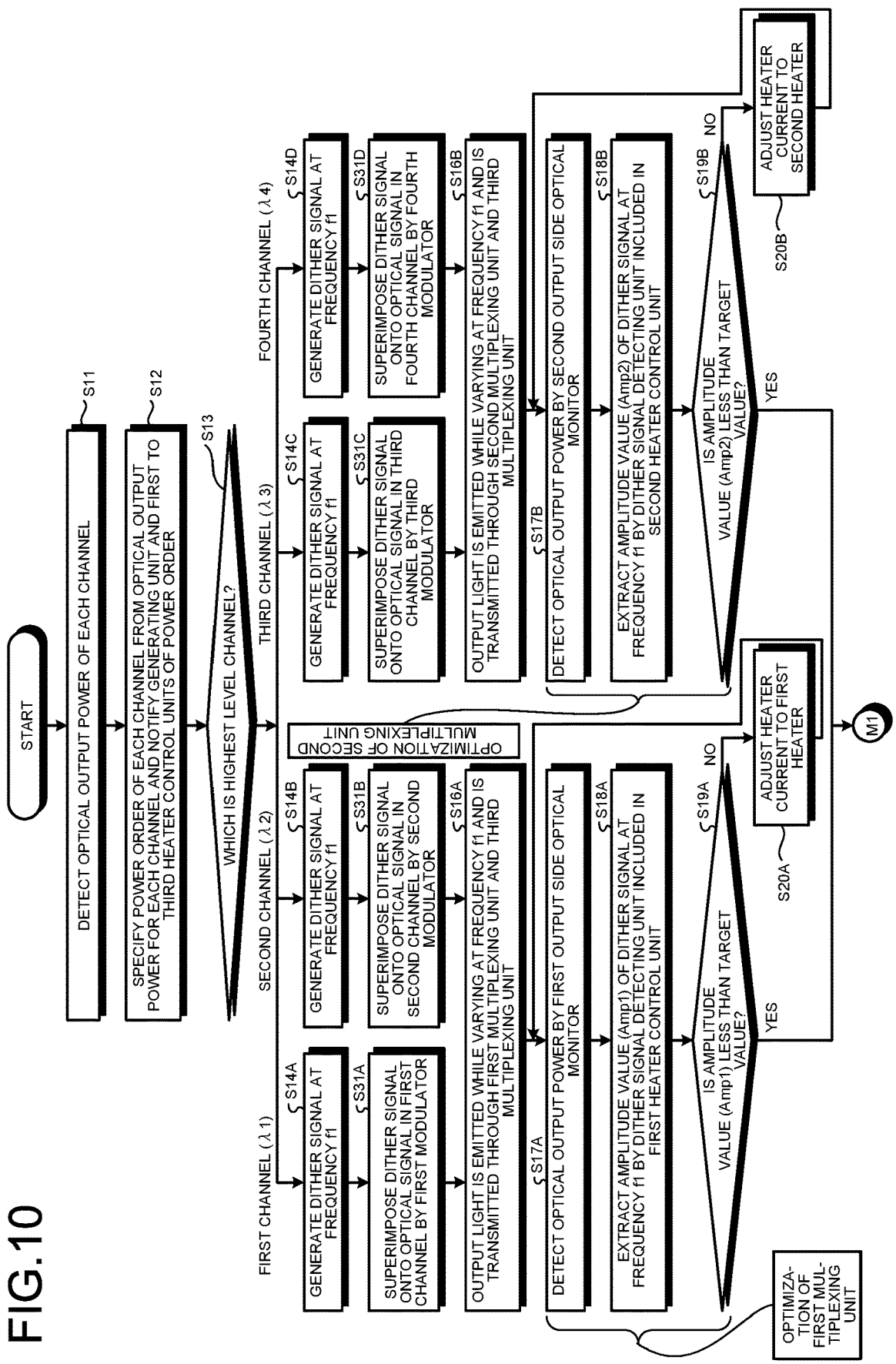
FIG. 10 is a flowchart illustrating a processing operation of the optical transmission device related to a second optimization process.

FIG. 10 is a flowchart illustrating an example of a processing operation of the optical transmission device 1B related to the second optimization process. In the second optimization process, the processes at Step S31A, Step S31B, Step S31C, and Step S31D are performed instead of the processes performed at Step S15A, Step S15B, Step S15C, and Step S15D.

When the channel having the highest level is the first channel, i.e., when a specific channel having the minimum optical output power is the first channel, the generating unit 8 generates a dither signal at the frequency f1 at Step S14A. Then, the first modulator 23A superimposes the dither signal onto the optical signal in the first channel (Step S31A), and moves to Step S16A in order to output and transmit the fluctuated optical signal at the frequency f1.

Furthermore, when the channel having the highest level is the second channel, i.e., when a specific channel having the minimum optical output power is the second channel, the generating unit. 8 generates a dither signal at the frequency f1 at Step S14B. Then, the second modulator 23B superimposes the dither signal onto the optical signal in the second channel (Step S31B) and moves to Step S16A in order to output and transmit the fluctuated optical signal at the frequency f1.

When the channel having the highest level is the third channel, i.e., when a specific channel having the minimum optical output power is the third channel, the generating unit 8 generates a dither signal at the frequency f1 at Step S14C. Then, the third modulator 23C superimposes the dither signal onto the optical signal in the third channel (Step S31C) and moves to Step S16B in order to output and transmit the fluctuated optical signal at the frequency f1.

Furthermore, when the channel having the highest level is the fourth channel, i.e., when a specific channel having the minimum optical output power is the fourth channel, the generating unit 8 generates a dither signal at the frequency f1 at Step S14D. Then, the fourth modulator 23D superimposes the dither signal onto the optical signal in the fourth channel (Step S31D) and moves to Step S16B in order to output and transmit the fluctuated optical signal at the frequency f1.

The optical transmission device 1B according to the third embodiment superimposes the dither signal onto the setting target channel in which the optical output power is the minimum and adjusts the heater current (phase set point) flowing to the heater 141 associated with the setting target channel such that the amplitude value of the dither signal in the setting target channel is less than the target value. Namely, the optical transmission device 1B adjusts the phase difference in the Mach-Zehnder unit 12 such that the amplitude value of the dither signal is less than the target value. Consequently, by adjusting the temperature of the heater 141 associated with the setting target channel and by adjusting the refractive index of each of the optical waveguides included in the Mach-Zehnder unit 12, it is possible to stabilize the optical output power of each of the channels by appropriately controlling the optical multiplexing filter 4 even when part variations or manufacturing variations are present.

Furthermore, in the optical transmission device 1B, when the dither signal is superimposed onto the optical signal in the setting target channel, because the dither signal is superimposed onto the modulated signal in the modulator 23 that modulates the optical signal in the setting target channel, it is possible to avoid a situation of affecting the APC or the ACC on the drive circuit 21 side.

[d] Fourth Embodiment

Figure 11:
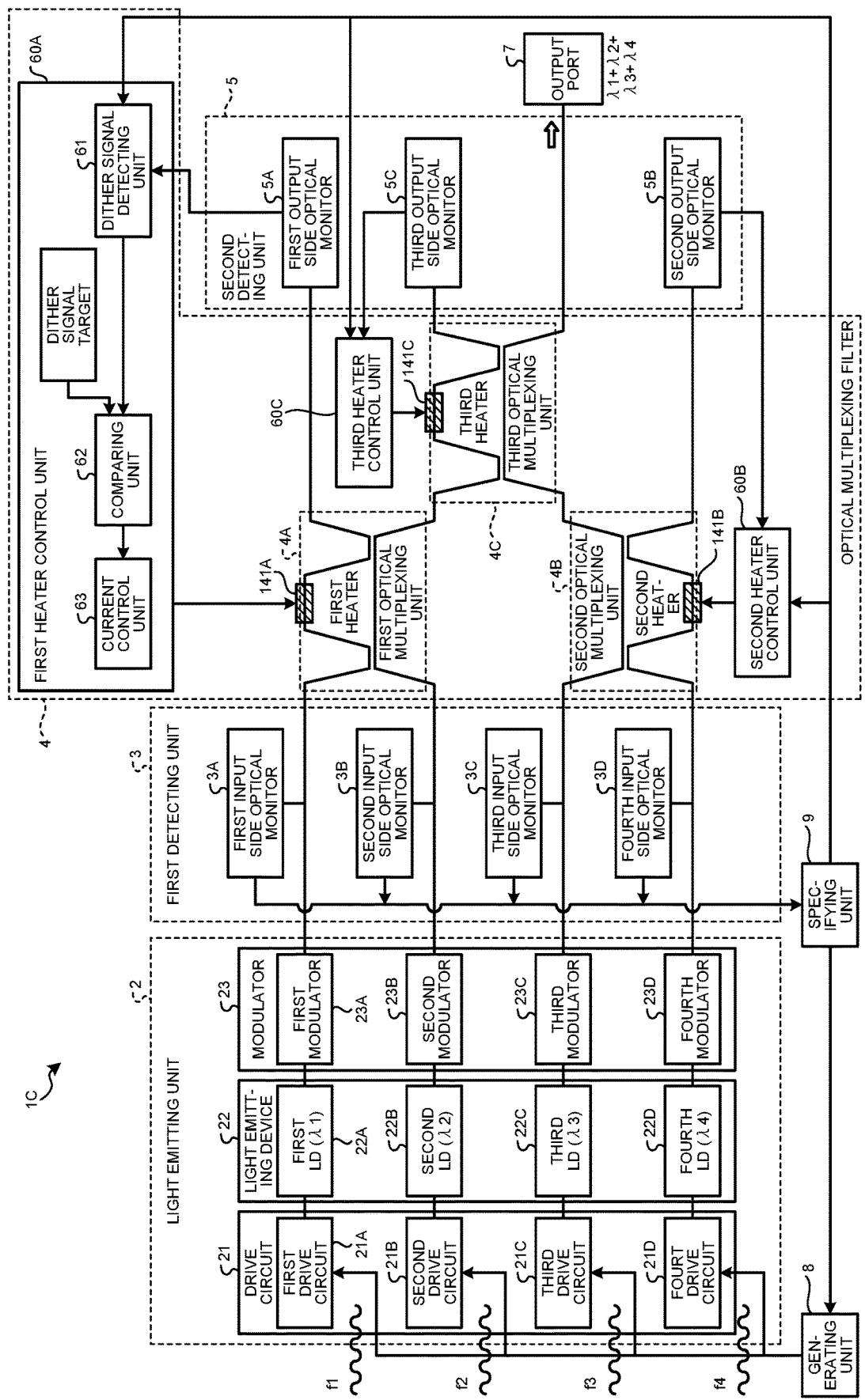
FIG. 11 is a block diagram illustrating an example of an optical transmission device according to a fourth embodiment.

FIG. 11 is a block diagram illustrating an example of an optical transmission device 1C according to the fourth embodiment. Furthermore, by assigning the same reference numerals to components having the same configuration as those in the optical transmission device 1A according to the second embodiment, overlapped descriptions of the configuration and the operation thereof will be omitted.

The optical transmission device 1C according to the fourth embodiment differs from the optical transmission device 1A according to the second embodiment in that dither signals at different frequencies f1 to f4 are input to the drive circuit 21 in each of the corresponding channels instead of inputting the dither signal generated by the generating unit 8 to the drive circuit 21 associated with the single setting target channel from among the plurality of channels.

The generating unit 8 inputs a first dither signal at the frequency f1 to the first drive circuit 21A associated with the first channel and inputs a second dither signal at the frequency f2 to the second drive circuit 21B associated with the second channel. Furthermore, the generating unit 8 inputs a third dither signal at the frequency f3 to third drive circuit 21C associated with the third channel and inputs a fourth dither signal at the frequency f4 to the fourth drive circuit 21D associated with the fourth channel. The generating unit 8 sequentially inputs the dither signals associated with the corresponding channels to each of the corresponding drive circuits 21 based on the power order specified by the specifying unit 9. When the dither signal associated with the own channel is input from the generating unit 8, each of the drive circuits 21 superimposes the subject dither signal onto the drive current.

The first drive circuit 21A superimposes the first dither signal onto the first drive current associated with the first channel and inputs the first drive current in which the first dither signal is superimposed to the first LD 22A. The first LD 22A emits light of the optical signal λ1 associated with the first channel in accordance with the first drive current in which the first dither signal is superimposed.

The second drive circuit 21B superimposes the second dither signal onto the second drive current associated with the second channel and inputs the second drive current in which the second dither signal is superimposed to the second LD 22B. The second LD 22B emits light of the optical signal λ2 associated with the second channel in accordance with the second drive current in which the second dither signal is superimposed.

The third drive circuit 21C superimposes the third dither signal onto the third drive current associated with the third channel and inputs the third drive current in which the third dither signal is superimposed to the third LD 22C. The third LD 22C emits light of the optical signal λ3 associated with the third channel in accordance with the third drive current in which the third dither signal is superimposed.

The fourth drive circuit 21D superimposes the fourth dither signal onto the fourth drive current associated with the fourth channel and inputs the fourth drive current in which the fourth dither signal superimposed to the fourth LD 22D. The fourth LD 22D emits light of the optical signal λ4 associated with the fourth channel in accordance with the fourth drive current in which the fourth dither signal is superimposed.

The first input side optical monitor 3A detects, from the first modulator 23A, the optical output power of the optical signal λ1 in the first channel in which the first dither signal is superimposed and notifies the specifying unit 9 of the optical output power of the optical signal λ1 associated with the first channel. The second input side optical monitor 3B detects, from the second modulator 23B, the optical output power of the optical signal λ2 in the second channel in which the second dither signal is superimposed and notifies the specifying unit 9 of the optical output power of the optical signal λ2 associated with the second channel.

The third input side optical monitor 3C detects, from the third modulator 23C, the optical output power of the optical signal λ3 in the third channel in which the third dither signal is superimposed and notifies the specifying unit 9 of the optical output power of the optical signal λ3 associated with the third channel. The fourth input side optical monitor 3D detects, from the fourth modulator 23D, the optical output power of the optical signal λ4 in the fourth channel in which the fourth dither signal is superimposed and notifies the specifying unit 9 of the optical output power of the optical signal λ4 associated with the fourth channel.

The specifying unit 9 specifies the power order of each of the channels from the magnitude of the monitor output voltage of each of the first to the fourth input side optical monitors 3A to 3D and notifies the generating unit 8 and the first to the third heater control units 60A to 60C of the power order.

The first optical multiplexing unit 4A multiplexes the optical signal λ1 associated with the first channel in which the first dither signal received from the first modulator 23A is superimposed and the optical signal λ2 associated with the second channel in which the second dither signal received from the second modulator 23B is superimposed. Then, the first optical multiplexing unit 4A inputs the multiplexed optical signal λ1+λ2 to the third optical multiplexing unit 4C via the output port 13A and outputs the optical signal to the first output side optical monitor 5A via the monitor port 13B.

Furthermore, the second optical multiplexing unit 4B multiplexes the optical signal λ3 associated with the third channel in which the third dither signal received from the third modulator 23C is superimposed and the optical signal λ4 associated with the fourth channel in which the fourth dither signal received from the fourth modulator 23D is superimposed. Then, the second optical multiplexing unit 4B inputs the multiplexed optical signal λ3+λ4 to the third optical multiplexing unit 4C via the output port 13A and outputs the optical signal to the second output side optical monitor 5B via the monitor port 13B.

The third optical multiplexing unit 4C multiplexes the optical signal λ1+λ2 associated with the first and the second channels multiplexed by the first optical multiplexing unit 4A and the optical signal λ3+λ4 associated with the third and the fourth channels multiplexed by the second optical multiplexing unit 4B. Then, the third optical multiplexing unit 4C outputs the multiplexed optical signal to the output port 7 via the output port 13A and outputs the multiplexed optical signal to the third output side optical monitor 5C via the monitor port 13B.

The first output side optical monitor 5A detects the optical output power of the optical signal λ1+λ2 that is associated with the first and the second channels and that is multiplexed by the first optical multiplexing unit 4A and notifies the dither signal detecting unit 61 included in the first heater control unit 60A of the detected optical output power. The dither signal detecting unit 61 detects the amplitude value of each of the first and the second dither signals from the optical output power of the first output side optical monitor 5A. When it is assumed that the first channel is the comparison target, the comparing unit 62 included in the first heater control unit 60A compares the amplitude value of the first dither signal with the target amplitude value of the first dither signal. The comparing unit 62 determines whether the amplitude value of the first dither signal is less than the target amplitude value of the first dither signal. When the amplitude value of the first dither signal is not less than the target amplitude value of the first dither signal, the current control unit 63 included in the first heater control unit 60A adjusts the heater current (phase set point) flowing to the first heater 141A such that the amplitude value of the first dither signal is less than the target value. Namely, the first heater control unit 60A adjusts the phase difference in the Mach-Zehnder unit 12 such that the amplitude value of the dither signal is less than the target value.

Furthermore, when it is assumed that the second channel is the comparison target, the comparing unit 62 included in the first heater control unit 60A compares the amplitude value of the second dither signal with the target amplitude value of the second dither signal. The comparing unit 62 determines whether the amplitude value of the second dither signal is less than the target amplitude value of the second dither signal. When the amplitude value of the second dither signal is not less than the target amplitude value of the second dither signal, the current control unit 63 included in the first heater control unit 60A adjusts the heater current (phase set point) flowing to the first heater 141A such that the amplitude value of the second dither signal is less than the target value. Namely, the first heater control unit 60A adjusts the phase difference in the Mach-Zehnder unit 12 such that the amplitude value of the dither signal is less than the target value.

The second output side optical monitor 5B detects the optical output power of the optical signal $\lambda 3+\lambda 4$ that is associated with the third and the fourth channels and that is multiplexed by the second optical multiplexing unit 4B and notifies the dither signal detecting unit 61 included in the second heater control unit 60B of the detected optical output power. The dither signal detecting unit 61 detects the amplitude value of each of the third and the fourth dither signals from the optical output power of the second output side optical monitor 53. When it is assumed that the third channel is the comparison target, the comparing unit 62 included in the second heater control unit 60B compares the amplitude value of the third dither signal with the target amplitude value of the third dither signal. The comparing unit 62 determines whether the amplitude value of the third dither signal is less than the target amplitude value of the third dither signal. When the amplitude value of the third dither signal is not less than the target amplitude value of the third dither signal, the current control unit 63 included in the second heater control unit 60B adjusts the heater current flowing to the second heater 141B such that the amplitude value of the third dither signal is less than the target value. Namely, the second heater control unit 60B adjusts the phase difference in the Mach-Zehnder unit 12 such that the amplitude value of the dither signal is less than the target value.

Furthermore, when it is assumed that the fourth channel is the comparison target, the comparing unit 62 included in the second heater control unit 60B compares the amplitude value of the fourth dither signal with the target amplitude value of the fourth dither signal. The comparing unit 62 determines whether the amplitude value of the fourth dither signal is less than the target amplitude value of the fourth dither signal. When the amplitude value of the fourth dither signal is not less than the target amplitude value of the second dither signal, the current control unit 63 included in the second heater control unit 60B adjusts the heater current flowing to the second heater 141B such that the amplitude value of the fourth dither signal is less than the target value. Namely, the second heater control unit 60B adjusts the phase difference in the Mach-Zehnder unit 12 such that the amplitude value of the dither signal is less than the target value.

The third output side optical monitor 5C detects the optical output power of the optical signal $\lambda 1+\lambda 2+\lambda 3+\lambda 4$ that is associated with the first to the fourth channels and that is multiplexed by the third optical multiplexing unit 4C and notifies the dither signal detecting unit 61 included in the third heater control unit 60C of the optical output power. The dither signal detecting unit 61 detects the amplitude value of each of the first to the fourth dither signals from the optical output power detected by the third output side optical monitor 5C. When it is assumed that the first channel is the comparison target, the comparing unit 62 included in the third heater control unit 60C compares the amplitude value of the first dither signal with the target amplitude value of the first dither signal. The comparing unit 62 determines whether the amplitude value of the first dither signal is less than the target amplitude value of the first dither signal. When the amplitude value of the first dither signal is not less than the target amplitude value of the first dither signal, the current control unit 63 included in the third heater control unit 60C adjusts the heater current flowing to the third heater 141C such that the amplitude value of the first dither signal is less than the target value. Namely, the third heater control unit 60C adjusts the phase difference in the Mach-Zehnder unit 12 such that the amplitude value of the dither signal is less than the target value.

Furthermore, when it is assumed that the second channel is the comparison target, the comparing unit 62 included in the third heater control unit 60C compares the amplitude value of the second dither signal with the target amplitude value of the second dither signal. The comparing unit 62 determines whether the amplitude value of the second dither signal is less than the target amplitude value of the second dither signal. When the amplitude value of the second dither signal is not less than the target amplitude value of the second dither signal, the current control unit 63 included in the third heater control unit 60C adjusts the heater current flowing to the third heater 141C such that the amplitude value of the second dither signal is less than the target value. Namely, the third heater control unit 60C adjusts the phase difference in the Mach-Zehnder unit 12 such that the amplitude value of the dither signal is less than the target value.

Furthermore, when it is assumed that the third channel is the comparison target, the comparing unit 62 included in the third heater control unit 60C compares the amplitude value of the third dither signal with the target amplitude value of the third dither signal. The comparing unit 62 determines whether the amplitude value of the third dither signal is less than the target amplitude value of the third dither signal. When the amplitude value of the third dither signal is not less than the target amplitude value of the third dither signal, the current control unit 63 included in the third heater control unit 60C adjusts the heater current flowing to the third heater 141C such that the amplitude value of the third dither signal is less than the target value. Namely, the third heater control unit 60C adjusts the phase difference in the Mach-Zehnder unit 12 such that the amplitude value of the dither signal is less than the target value.

Furthermore, when it is assumed that the fourth channel is the comparison target, the comparing unit 62 included in the third heater control unit 60C compares the amplitude value of the fourth dither signal with the target amplitude value of the fourth dither signal. The comparing unit 62 determines whether the amplitude value of the fourth dither signal is less than the target amplitude value of the fourth dither signal. When the amplitude value of the fourth dither signal is greater than or equal to the target amplitude value of the fourth dither signal, the current control unit 63 included in the third heater control unit 60C adjusts the heater current flowing to the third heater 141C such that the amplitude value of the fourth dither signal is less than the target value. Namely, the third heater control unit 60C adjusts the phase difference in the Mach-Zehnder unit 12 such that the amplitude value of the dither signal is less than the target value.

Figure 12:
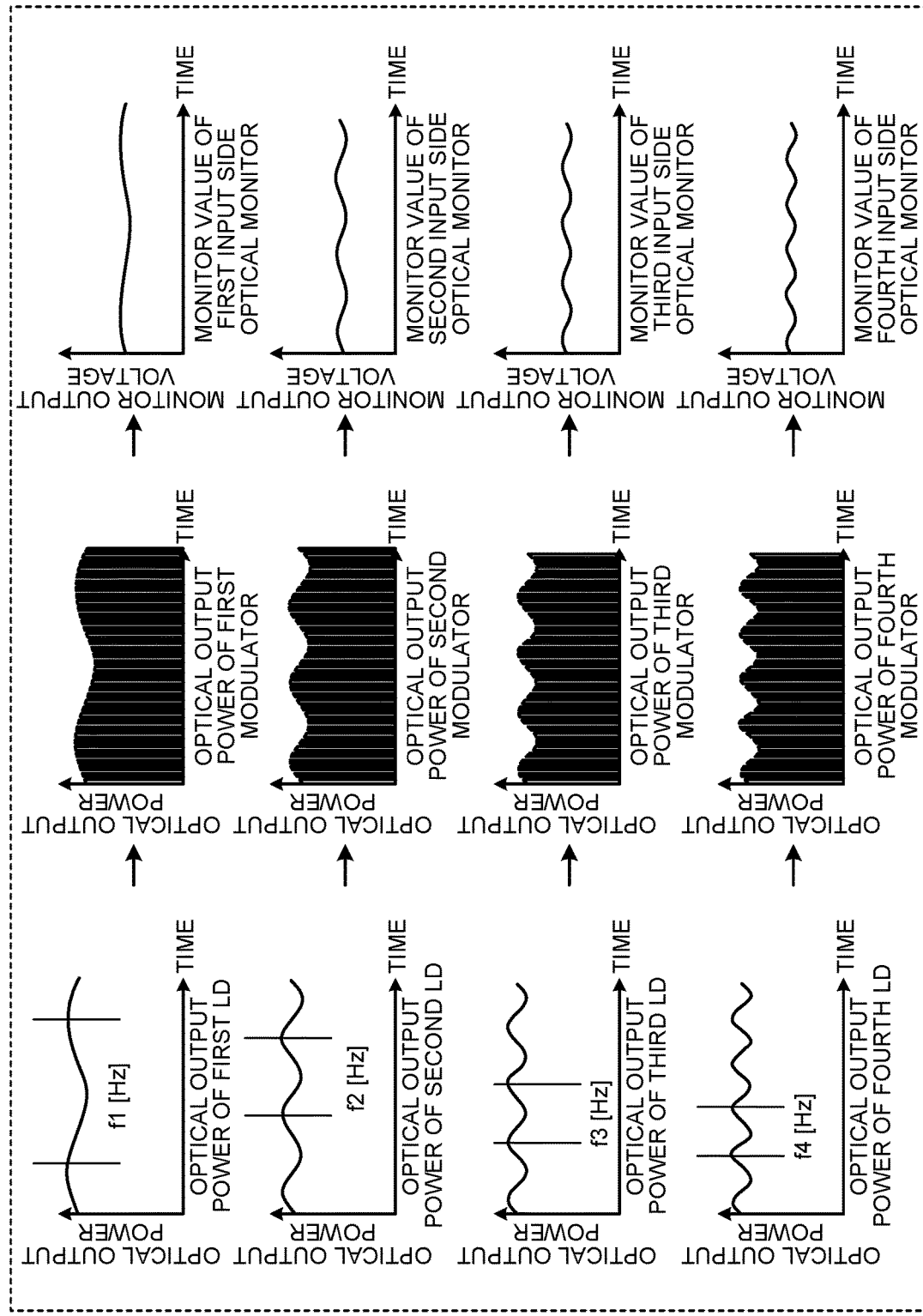
FIG. 12 is a diagram illustrating as example of an output of each of the first to a fourth LDs, the first to a fourth modulators, and the first to a fourth input side optical monitors associated with the corresponding channels.

FIG. 12 is a diagram illustrating an example of each of the outputs of the first to the fourth LDs 22A to 22D, the first to the fourth modulators 23A to 23D, and the first to the fourth input side optical monitors 3A to 3D associated with the corresponding channels. In the first LD 22A, fluctuations in the frequency f1 occur in the optical output power of the optical signal λ1 in accordance with the superimposed first dither signal. In the first modulator 23A, fluctuations in the frequency f1 occur in the optical output power of the optical signal λ1 in accordance with the superimposed first dither signal. In the first input side optical monitor 3A, fluctuations in the frequency f1 occur in the optical output power of the optical signal λ1 in accordance with superimposed first dither signal.

In the second LD 22B, fluctuations in the frequency f2 occur in the optical output power of the optical signal λ2 in accordance with the superimposed second dither signal. In also the second modulator 23B, fluctuations in the frequency f2 occur in the optical output power of the optical signal λ2 in accordance with the superimposed second dither signal. In also the second input side optical monitor 3B, fluctuations in the frequency f2 occur in the optical output power of the optical signal λ2 in accordance with the superimposed second dither signal.

In the third LD 22C, fluctuations in the frequency f3 occur in the optical output power of the optical signal λ3 in accordance with the superimposed third dither signal. In also the third modulator 23C, fluctuations in the frequency f3 occur in the optical output power of the optical signal λ3 in accordance with the superimposed third dither signal. In also the third input side optical monitor 3C, fluctuations in the frequency f3 occur in the optical output power of the optical signal λ3 in accordance with the superimposed third dither signal.

In the fourth LD 22D, fluctuations in the frequency f4 occur in the optical output power of the optical signal λ4 in accordance with the superimposed fourth dither signal. In also the fourth modulator 23D, fluctuations in the frequency f4 occur in the optical output power of the optical signal λ4 in accordance with the superimposed fourth dither signal. In the fourth input side optical monitor 3D, fluctuations in the frequency f4 occur in the optical output power of the optical signal λ4 in accordance with the superimposed fourth dither signal.

Figure 13:
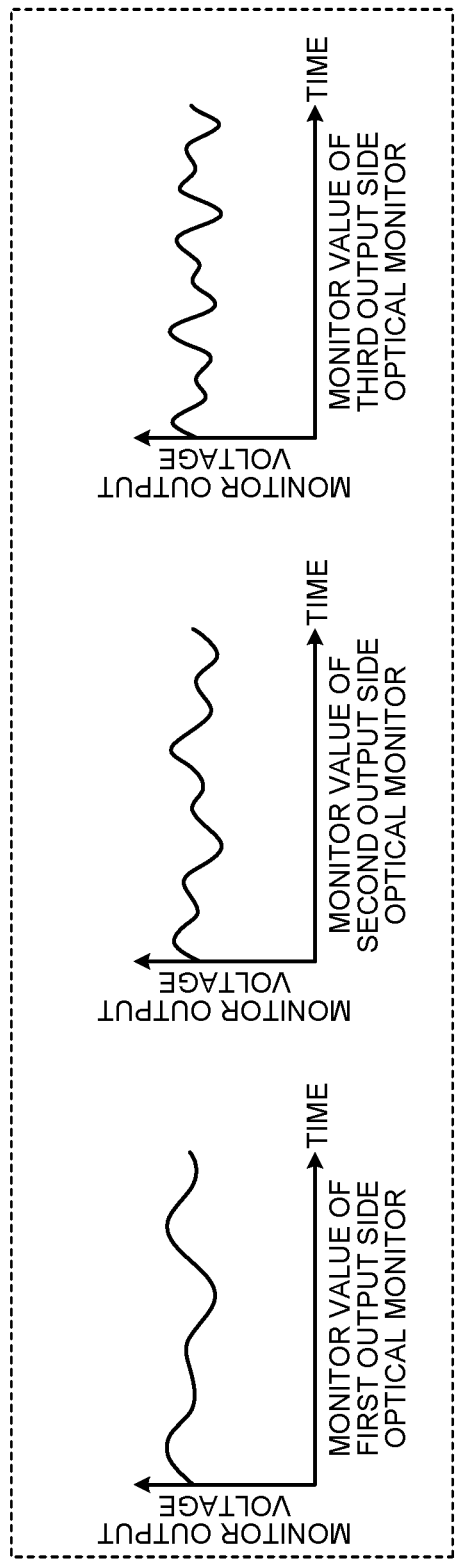
FIG. 13 is a diagram illustrating an example of a comparison of each output in the first to the third output side optical monitors.

FIG. 13 is a diagram illustrating an example of a comparison of each of the outputs of the first to the third output side optical monitors 5A to 5C. In the first output side optical monitor 5A, fluctuations in the frequencies f1 and f2 occur in the optical output power of the optical signal λ1+λ2 received from the first optical multiplexing unit 4A in accordance with the superimposed first and the second dither signals. In the second output side optical monitor 5B, fluctuations in the frequencies f3 and f4 occur in the optical output power of the optical signal λ3+λ4 received from the second optical multiplexing unit 4B in accordance with the superimposed third and the fourth dither signals. Furthermore, in also the third output side optical monitor 5C, fluctuations in the frequencies f1 to f4 occur in the optical output power of the optical signal λ1+λ2+λ3+λ4 received from the third optical multiplexing unit 4C in accordance with the superimposed first to the fourth dither signals.

Figure 14:
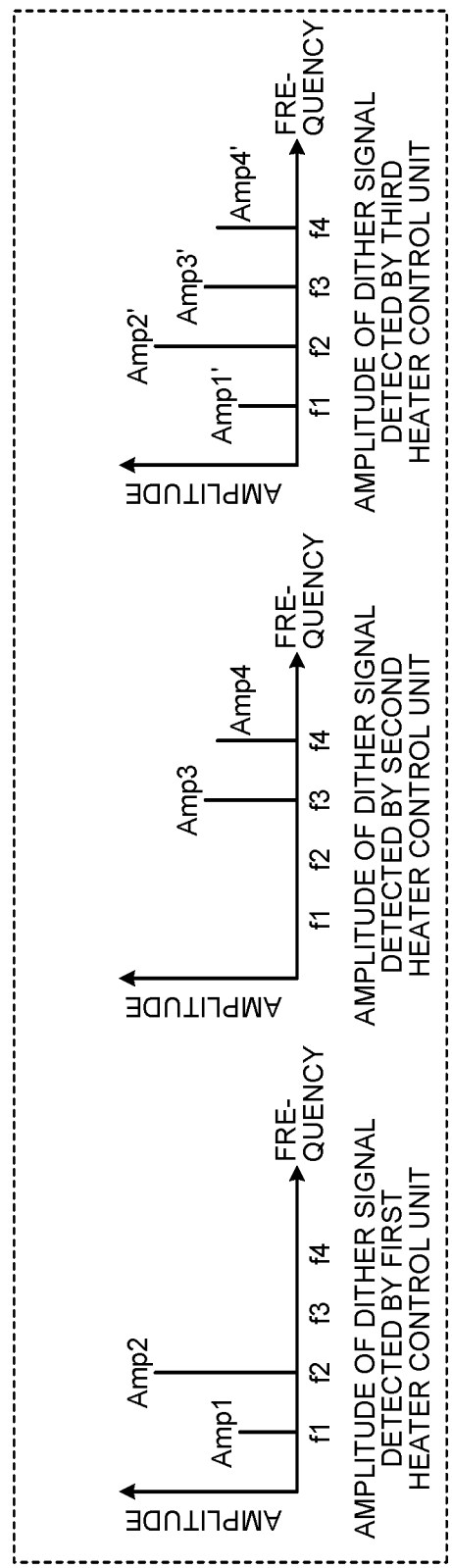
FIG. 14 is a diagram illustrating an example of a comparison of an output of a dither signal detecting unit included in each of the first to the third heater control unit.

FIG. 14 is a diagram illustrating an example of comparisons of an output of the dither signal detecting unit 61 included in each of the first to the third heater control units 60A to 60C. The dither signal detecting unit 61 included in the first heater control unit 60A detects the amplitude value of each of the first and the second dither signals because the first and the second dither signals are superimposed onto the optical signal λ1+λ2 multiplexed by the first optical multiplexing unit 4A. The dither signal detecting unit 61 included in the second heater control unit 60B detects the amplitude value of each of the third and the fourth dither signals because the third and the fourth dither signals are superimposed onto the optical signal λ3+λ4 multiplexed by the second optical multiplexing unit 4B. Furthermore, the dither signal detecting unit 61 included in the third heater control unit 60C also detects the amplitude value of each of the first to the fourth dither signals because the first to the fourth dither signals are superimposed onto the optical signal λ1+λ2+λ3+λ4 multiplexed by the third optical multiplexing unit 4C.

Figure 15A:
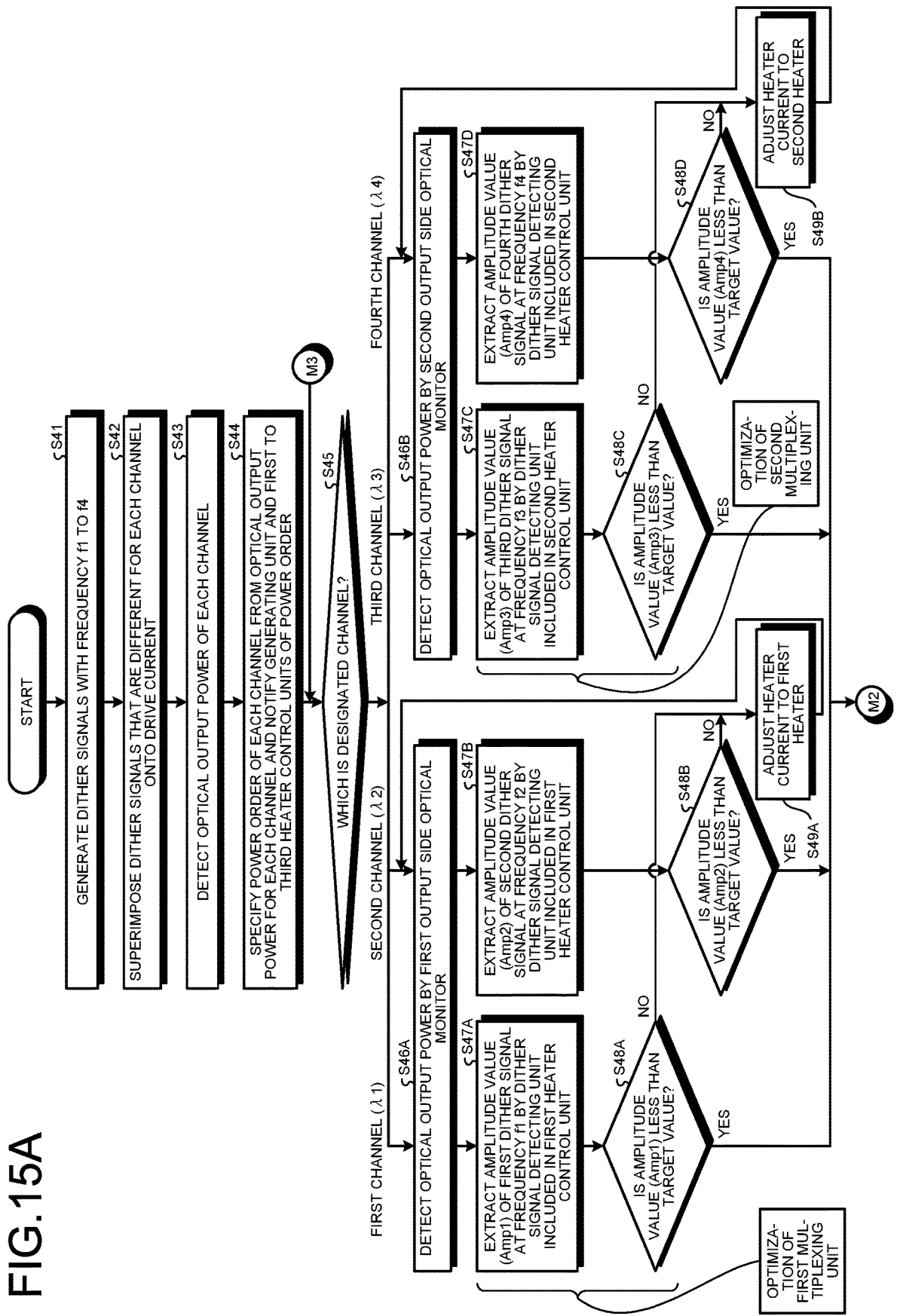
FIG. 15A is a flowchart illustrating an example of a processing operation of the optical transmission device related to a third optimization process.
Figure 15B:
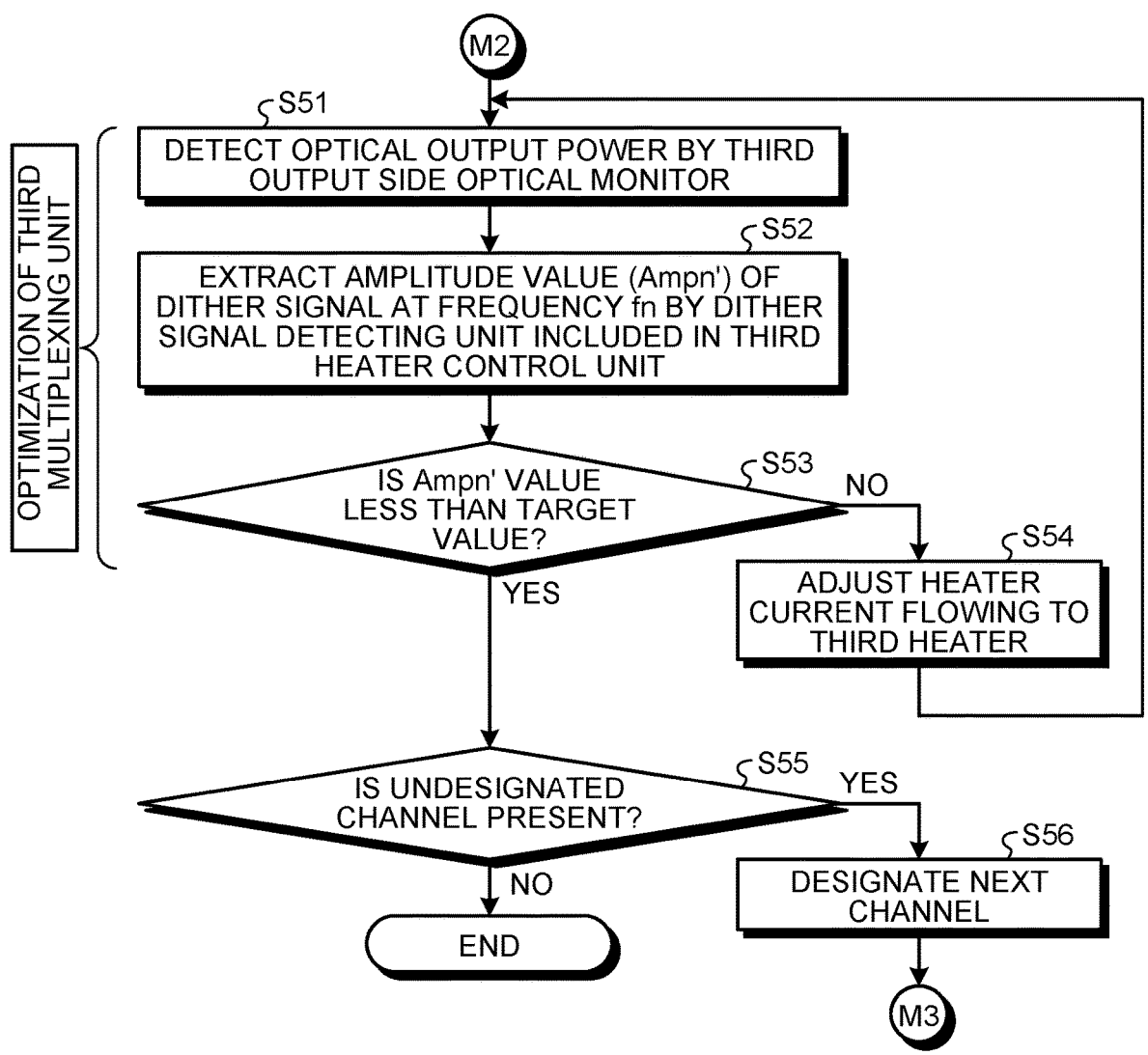
FIG. 15B is a flowchart illustrating an example of a processing operation of the optical transmission device related to the second optimization process.

FIG. 15A and FIG. 15B are flowcharts each illustrating an example of a processing operation of the optical transmission device 1C related to the third optimization process. In FIG. 15A, the generating unit 8 included in the optical transmission device 1C generates the first to the fourth dither signals at the frequencies f1 to f4, respectively (Step S41). Each of the drive circuits 21 superimposes the dither signal onto the drive current associated with the channel (Step S42). Furthermore, the first drive circuit 21A superimposes the first dither signal onto the first drive current associated with the first channel. The second drive circuit 21B superimposes the second dither signal onto the second drive current associated with the second channel. The third drive circuit 21C superimposes the third dither signal onto the third drive current associated with the third channel. The fourth drive circuit 21D superimposes the fourth dither signal onto the fourth drive current associated with the fourth channel.

The first to the fourth input side optical monitors 3A to 3D detect the optical output power of the first to the fourth channels, respectively (Step S43). The specifying unit 9 specifies the power order for each channel based on the magnitude of the optical output power of each of the first to the fourth channels detected by the associated first to the fourth input side optical monitors 3A to 3D, respectively, and notifies the generating unit 8 and the first to the third heater control units 60A to 60C of the power order (Step S44). Furthermore, the power order is set such that the channel having the minimum optical output power is the highest level and the channel having the maximum optical output power is the lowest level. The generating unit 8 designates a channel based on the power order received from the specifying unit 9 (Step S45).

When the designated channel is the first channel at Step S45, the first output side optical monitor 5A detects the optical output power of the optical signal λ1+λ2 that is multiplexed by the first optical multiplexing unit 4A (Step S46A). The dither signal detecting unit 61 included in the first heater control unit 60A extracts the amplitude value of the first dither signal at the frequency f1 from the optical output power of the optical signal λ1+λ2 detected by the first output side optical monitor 5A (Step S47A). The comparing unit 62 included in the first heater control unit 60A compares the amplitude value of the first dither signal extracted at Step S47A with the target value of the first dither signal and determines whether the amplitude value of the first dither signal is less than the target value of the first dither signal (Step S48A).

When the amplitude value of the first dither signal is not less than the target value (No at Step S48A), the current control unit 63 included in the first heater control unit 60A adjusts the heater current (phase set point) flowing to the first heater 141A (Step S49A). Namely, the current control unit 63 adjusts the heater current (phase set point) flowing to the first heater 141A such that the amplitude value of the first dither signal is less than the target value. Then, the process moves to Step S46A in order to monitor the optical output power received from the first optical multiplexing unit 4A by way of the first output side optical monitor 5A. When the amplitude value of the first dither signal in the first heater control unit 60A is less than the target value (Yes at Step S48A), the third output side optical monitor 5C moves to M2 illustrated in FIG. 15B.

When the designated channel is the second channel at Step S45, the first output side optical monitor 5A moves to Step S46A in order to detect the optical output power of the optical signal λ1+λ2 that is multiplexed by the first optical multiplexing unit 4A. The dither signal detecting unit 61 included in the first heater control unit 60A extracts amplitude value of the second dither signal at the frequency f2 from the optical output power of the optical signal λ1+λ2 detected by the first output side optical monitor 5A (Step S47B). The comparing unit 62 included in the first heater control unit 60A compares the amplitude value of the second dither signal extracted at Step S47B with the target value of the second dither signal and determines whether the amplitude value of the second dither signal is less than the target value of the second dither signal (Step S48B).

When the amplitude value of the second dither signal is not less than the target value of the second dither signal (No at Step S48B), the current control unit 63 included in the first heater control unit 60A moves to Step S49A. Namely, the current control unit 63 adjusts the heater current (phase set point) flowing to the first heater 141A such that the amplitude value of the second dither signal is less than the target value of the second dither signal.

When the amplitude value of the second dither signal in the first heater control unit 60A is less than the target value (Yes at Step S48B), the first output side optical monitor 5A moves to M2 illustrated in FIG. 15B.

When the designated channel is the third channel at Step S45, the second output side optical monitor 5B detects the optical output power of the optical signal λ2+λ3 multiplexed by the second optical multiplexing unit 4B (Step S46B). The dither signal detecting unit 61 included in the second heater control unit 60B extracts the amplitude value of the third dither signal at the frequency f3 from the optical output power of the optical signal λ3+λ4 detected by the second output side optical monitor 5B (Step S47C). The comparing unit 62 included in the second heater control unit 60B compares the amplitude value of the third dither signal extracted at Step S47C with the target value of the third dither signal and determines whether the amplitude value of the third dither signal is less than the target value of the third dither signal (Step S48C).

When the amplitude value of the third dither signal is not the target value of the third dither signal (No at Step S48C), the current control unit 63 included in the second heater control unit 60B adjusts the heater current (phase set point) flowing to the second heater 141B (Step S49B). Namely, the current control unit 63 adjusts the heater current (phase set point) flowing to the second heater 141B such that the amplitude value of the third dither signal is less than the target value of the third dither signal. Then, the process moves to Step S46B in order for the second output side optical monitor 5B to monitor the optical output power of the optical signal λ3+λ4 received from the second optical multiplexing unit 4B. When the amplitude value of the third dither signal in the second heater control unit 60B is less than the target value (Yes at Step S48S), the third output side optical monitor 5C moves to M2 illustrated in FIG. 15B.

When the designated channel is the fourth channel at Step S45, the second output side optical monitor 5B moves to Step S46B in order to detect the optical output power of the optical signal λ3+λ4 multiplexed by the second optical multiplexing unit 4B. The dither signal detecting unit 61 included in the second heater control unit 60B extracts the amplitude value of the fourth dither signal at the frequency f4 from the optical output power of the optical signal λ3+λ4 detected by the second output side optical monitor 5B (Step S47D). The comparing unit 62 included in the second heater control unit 60B compares the amplitude value of the fourth dither signal extracted at Step S47D with the target value of the fourth dither signal and determines whether the amplitude value of the fourth dither signal is less than the target value of the fourth dither signal (Step S48D).

When the amplitude value of the fourth dither signal is not less than the target value of the fourth dither signal (No at Step S48D), the current control unit 63 included in the second heater control unit 60B moves to Step S49B. Namely, the current control unit 63 adjusts the heater current (phase set point) flowing to the second heater 141B such that the amplitude value of the fourth dither signal is less than the target value of the fourth dither signal. When the amplitude value of the fourth dither signal in the second heater control unit 60B is less than the target value (Yes at Step S48D), the second heater control unit 60B moves to M2 illustrated in FIG. 15B.

When the amplitude value of the first dither signal is less than the target value (Yes at Step S48A), the third output side optical monitor 5C detects the optical output power of the optical signal λ1+λ2+λ3+λ4 output from the monitor port 13B of the third optical multiplexing unit 4C (Step S51). When the amplitude value of the second dither signal is less than the target value (Yes at Step S48B), the third output side optical monitor 5C moves to Step S51. When the amplitude value of the third dither signal is less than the target value (Yes at Step S48C), the third output side optical monitor 5C moves to Step S51. When the amplitude value of the fourth dither signal is less than the target value (Yes at Step S48D), the third output side optical monitor 5C moves to Step S51.

The dither signal detecting unit 61 included in the third heater control unit 60C extracts the amplitude values of the first to the fourth dither signals at the frequencies f1 to f4, respectively, from the optical output power detected by the third output side optical monitor 5C (Step S52). The comparing unit 62 included in the third heater control unit 60C sequentially compares the amplitude value of each of the dither signals extracted at Step S52 with the target value of each of the dither signals and determines whether the amplitude value of each of the dither signals is less than the target value (Step S53).

When the amplitude value of each of the dither signals is not less than the target value (No at Step S53), the current control unit 63 included in the third heater control unit 60C adjusts the heater current (phase set point) flowing to the third heater 141C (Step S54). Then, the process moves to Step S51 in order for the third output side optical monitor 5C to monitor the optical output power of the optical signal λ1+λ2+λ3+λ4 received from the third optical multiplexing unit 4C.

When the amplitude value of each of the dither signals in the third heater control unit 60C is less than the target value (Yes at Step S53), the third heater control unit 60C determines whether an undesignated channel is present (Step S55). When an undesignated channel is present (Yes at Step S55), the third heater control unit 60C designates a next channel (Step S56) and moves to Step S45 of M3 illustrated in FIG. 15A. When an undesignated channel is not present (No at Step S55), the third heater control unit 60C ends the third optimization process illustrated in FIG. 15B.

The optical transmission device 15 according to the fourth embodiment superimposes dither signal that are different for each channel onto all of the channels and adjusts the heater current (phase set point) of each of the heaters 141 associated with the corresponding channels such that the amplitude values of the dither signals associated with all of the channels are less than the target value. Namely, the optical transmission device 15 adjusts the phase difference in the Mach-Zehnder unit 12 such that the amplitude value of each of the dither signals is less than the target value. Consequently, by adjusting the temperature of the heaters 141 associated with all of the channels and by adjusting the refractive index of each of the optical waveguides included in the Mach-Zehnder unit 12, it is possible to stabilize the optical output power of each of the channels by appropriately controlling the optical multiplexing filters associated with all of the channels even when part variations or manufacturing variations are present.

[e] Fifth Embodiment

Figure 16:
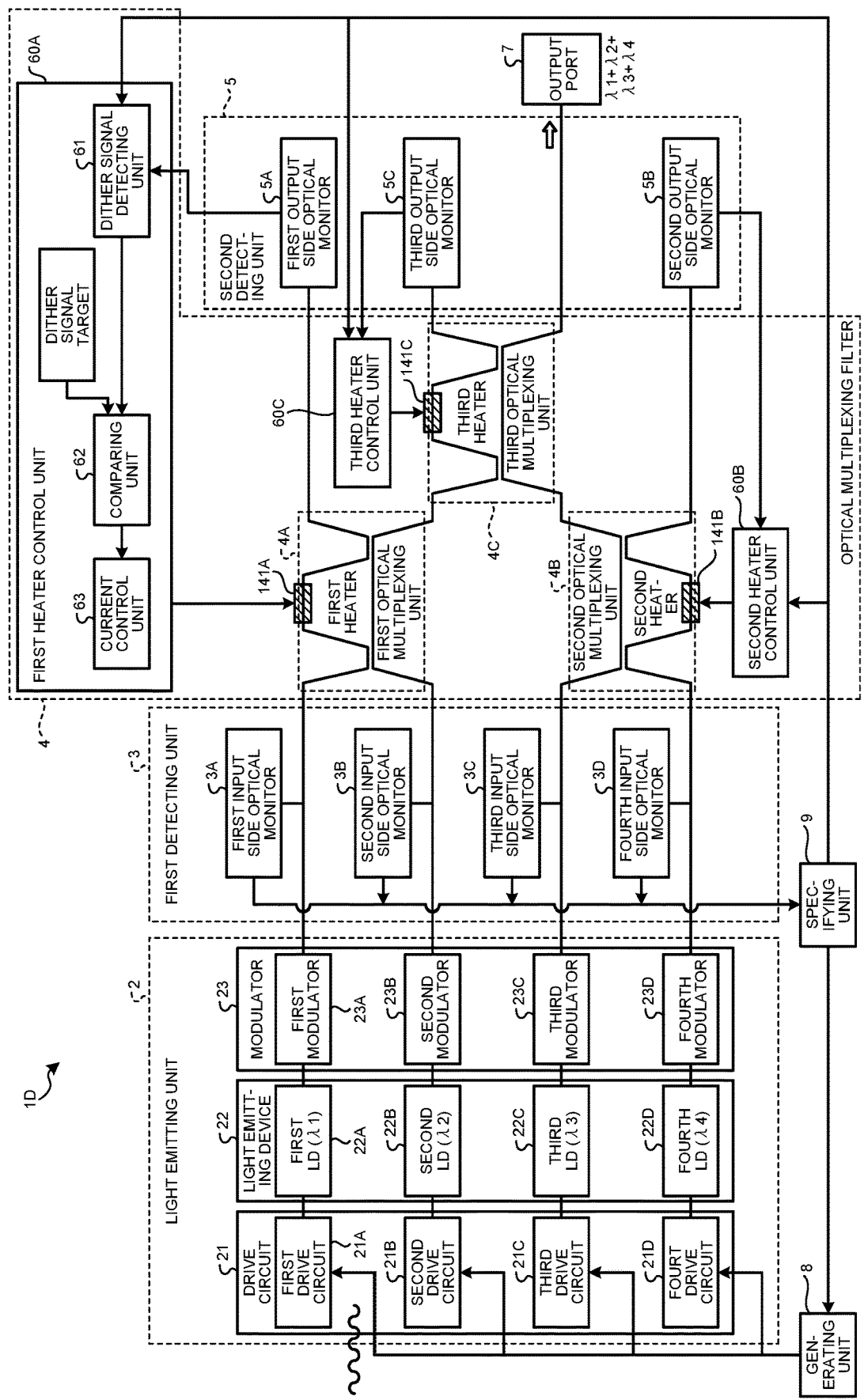
FIG. 16 is a block diagram illustrating an example of an optical transmission device according to a fifth embodiment.

FIG. 16 is a block diagram illustrating an example of an optical transmission device 1D according to a fifth embodiment. Furthermore, by assigning the same reference numerals to components having the same configuration as those in the optical transmission device 1A according to the second embodiment, overlapped descriptions of the configuration and the operation thereof will be omitted.

The optical transmission device 1D according to the fifth embodiment differs from the optical transmission device 1A according to the second embodiment in that dither signals at the same frequency are input to the drive circuit 21 associated with all of the channels instead of inputting the dither signal generated by the generating unit 8 to the drive circuit 21 associated with the single setting target channel from among the plurality of channels.

Figure 17A:
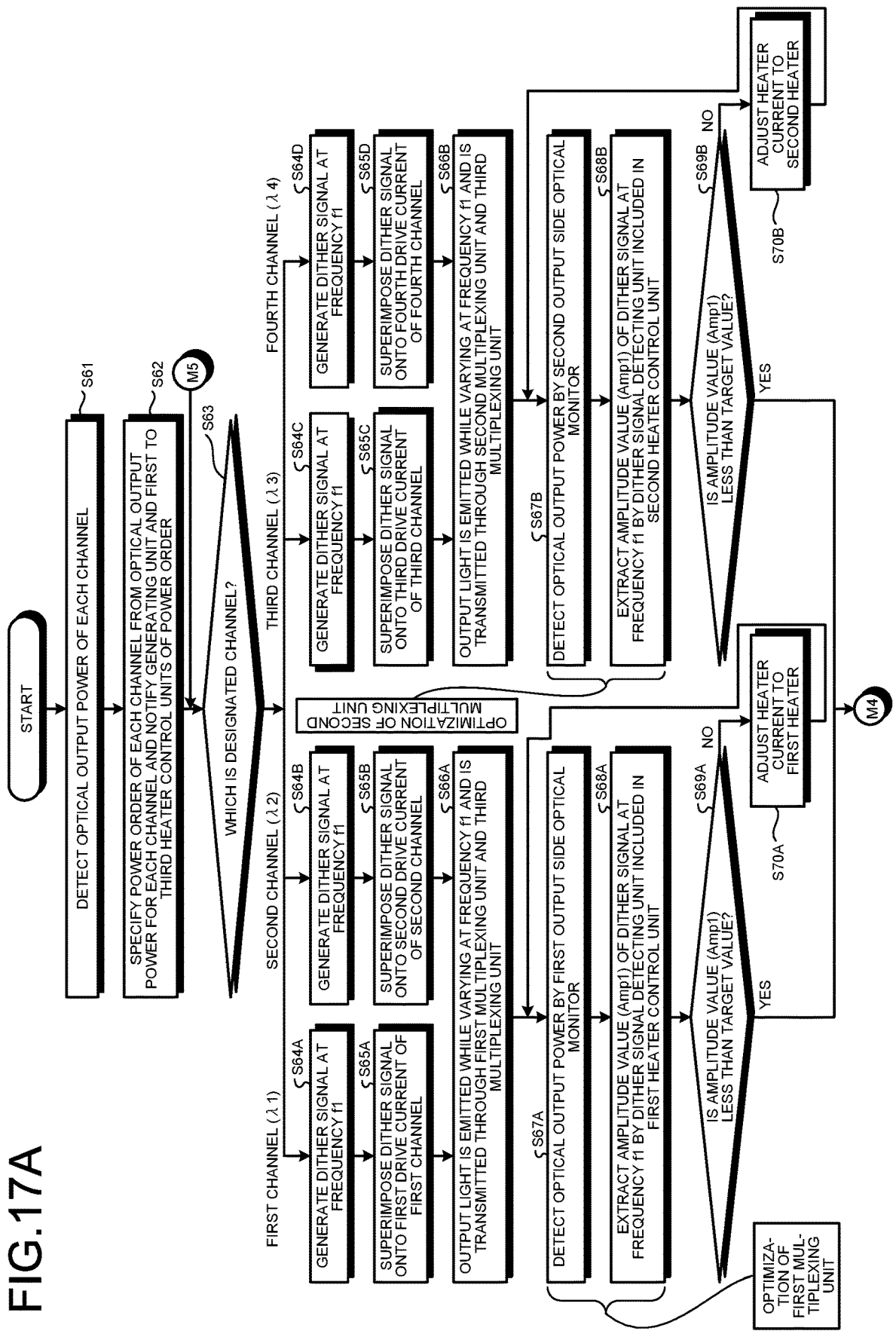
FIG. 17A is a flowchart illustrating an example of a processing operation of the optical transmission device related to a fourth optimization process.
Figure 17B:
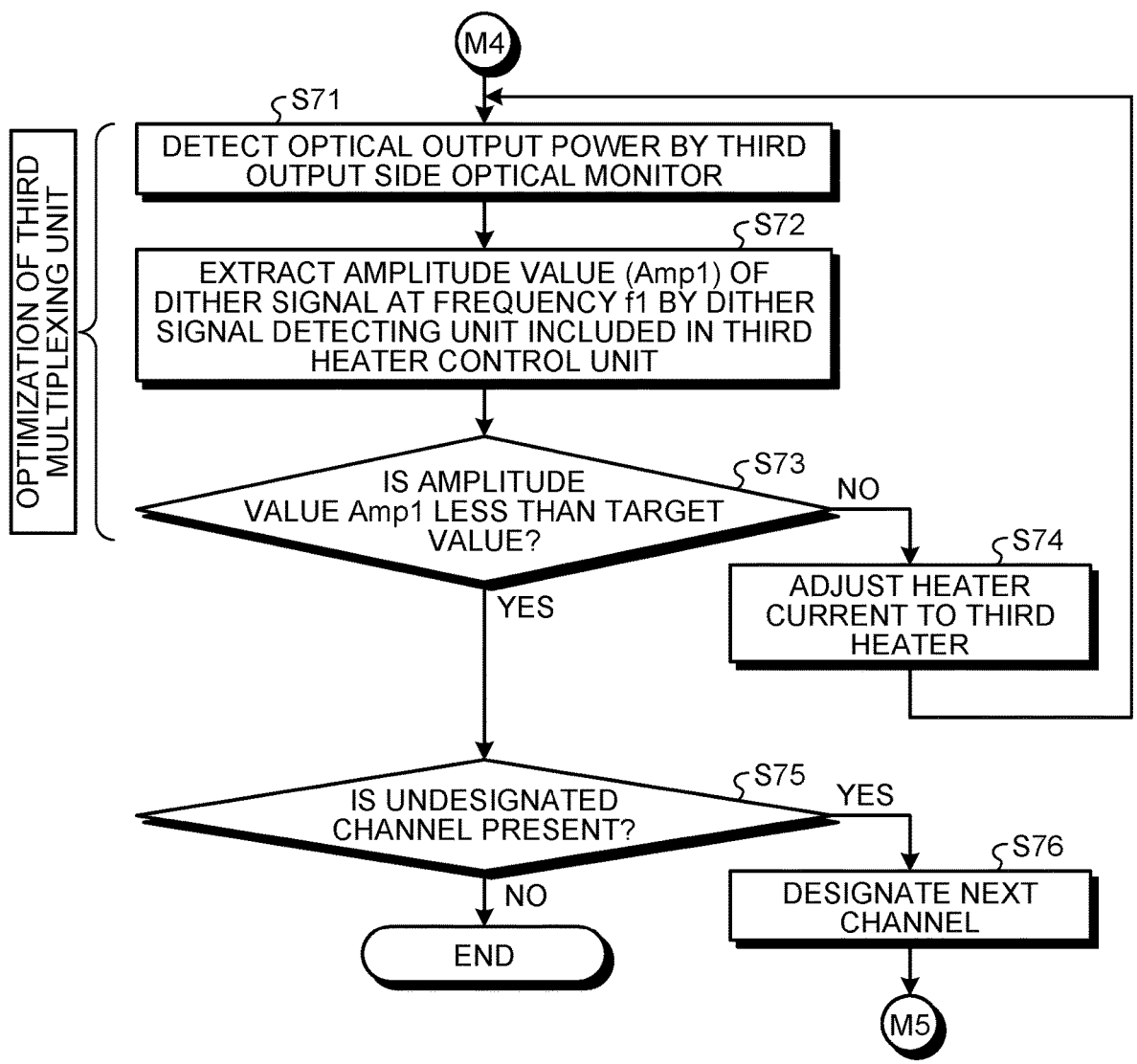
FIG. 17B is a flowchart illustrating an example of a processing operation of the optical transmission device related to the fourth optimization process.
Figure 18:
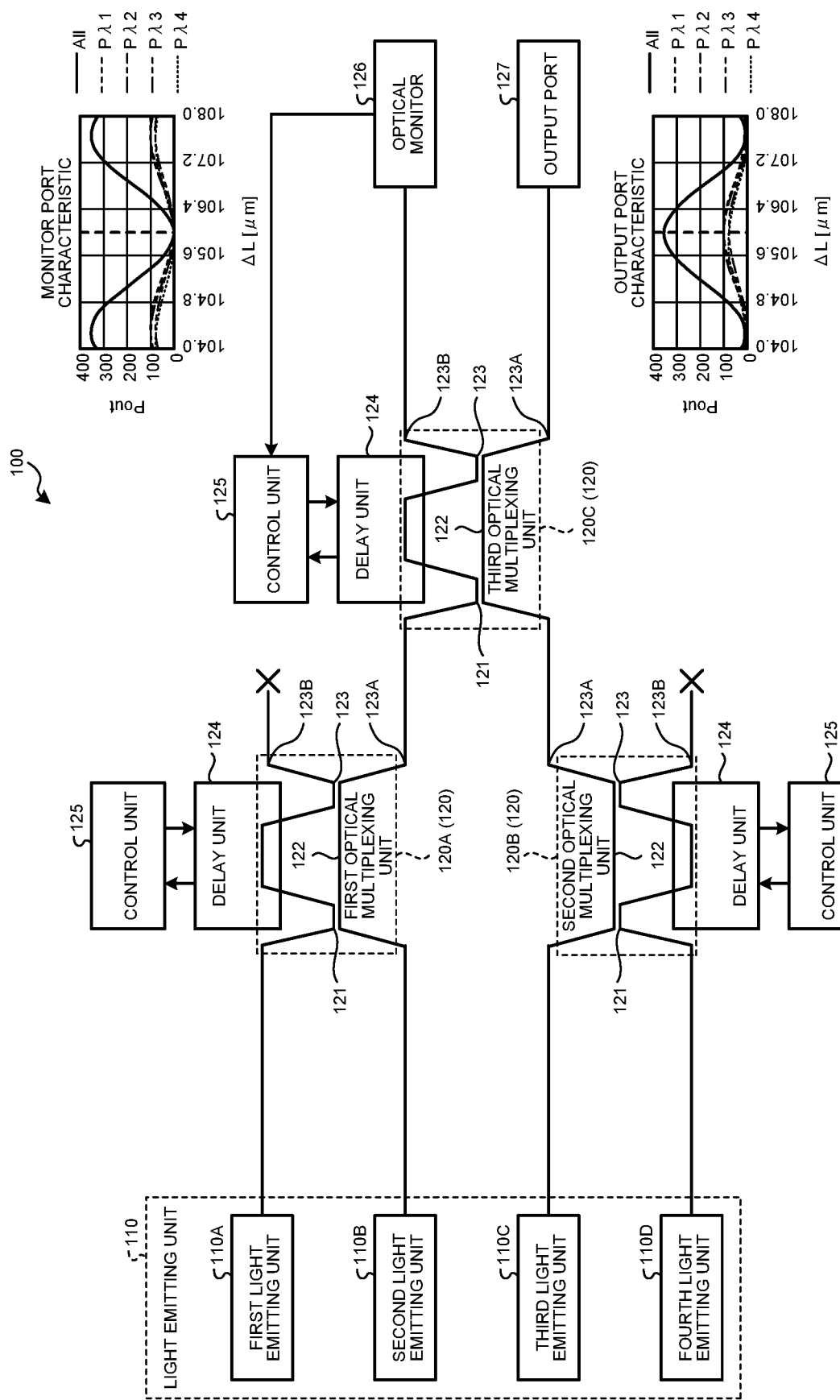
FIG. 18 is a block diagram illustrating an example of a conventional optical transmission device.
Figure 19:
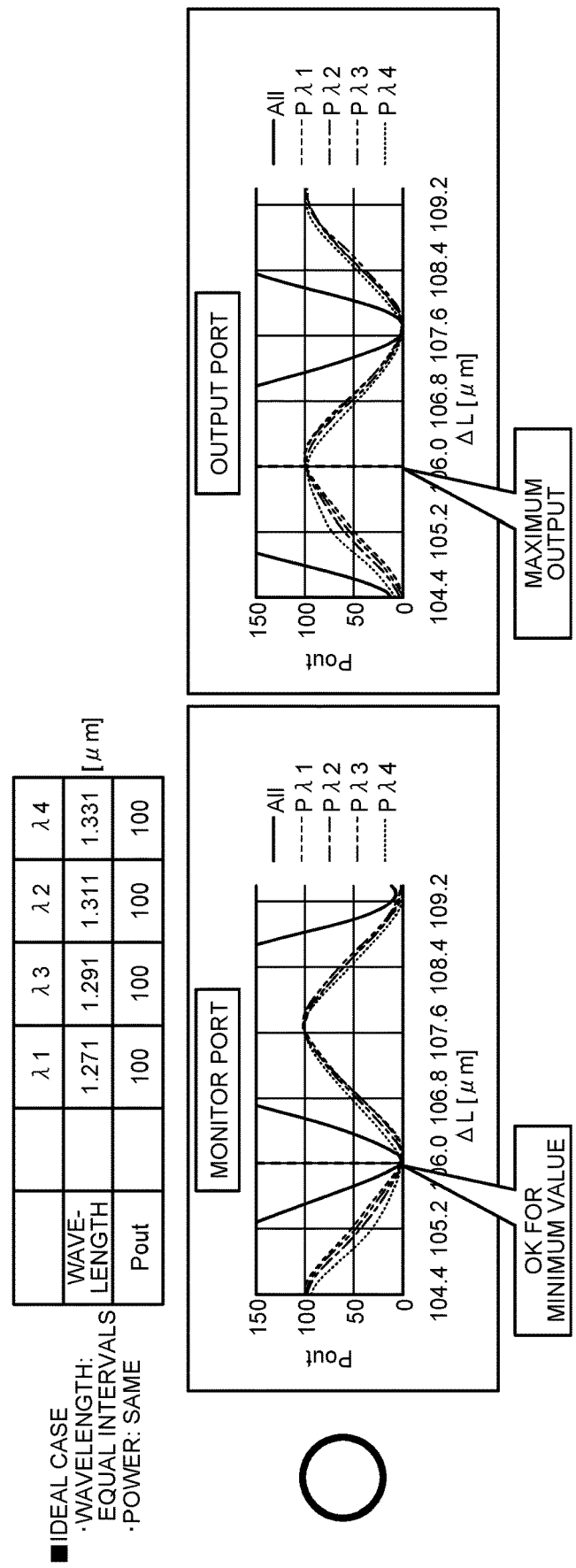
FIG. 19 is a diagram illustrating an example (ideal case) of outputs of an output port and a monitor port in the conventional optical transmission device.

FIG. 17A and FIG. 17B are flowcharts each illustrating an example of a processing operation of the optical transmission device 1D related to a fourth optimization process. In FIG. 17A, each of the first to the fourth input side optical monitors 3A to 3D included in the optical transmission device 1D detects optical output power in the first to the fourth channels (Step S61). The specifying unit 9 specifies the power order for each channel based on the magnitude of the optical output power of the optical signals in the first to the fourth channels detected by the first to the fourth input side optical monitors 3A to 3D, respectively, and notifies the generating unit 8 and the first to the third heater control units 60A to 60C of the power order (Step S62). Furthermore, the power order is set such that the channel having the minimum optical output power is the highest level and the channel having the maximum optical output power is the lowest level.

The generating unit 8 determines the designated channel based on the power order received from the specifying unit 9 (Step S63). When the designated channel is the first channel, the generating unit 8 generates a dither signal at the frequency f1 (Step S64A). The first drive circuit 21A superimposes the dither signal at the frequency f1 onto the first drive current flowing through the first channel (Step S65A). Consequently, the first LD 22A emits light of the optical signal λ1 associated with the first channel in accordance with the first drive current in which the dither signal is superimposed.

The first optical multiplexing unit 4A outputs and transmits the fluctuated optical signal λ1+λ2 at the frequency f1 and the third optical multiplexing unit 4C also outputs and transmits the fluctuated optical signal λ1+λ2+λ3+λ4 at the frequency f1 (Step S66A). The first output side optical monitor 5A detects the optical output power of the optical signal λ1+λ2 output from the monitor port 13B of the first optical multiplexing unit 4A (Step S67A). The dither signal detecting unit 61 included in the first heater control unit 60A extracts the amplitude value of the dither signal at the frequency f1 from the optical output power of the optical signal λ1+λ2 detected by the first output side optical monitor 5A (Step S68A). The comparing unit 62 included in the first heater control unit 60A compares the amplitude value of the dither signal extracted at Step S68A with the target value and determines whether the amplitude value is less than the target value (Step S69A).

When the amplitude value is not less than the target value (No at Step S69A), the current control unit 63 included in the first heater control unit 60A adjusts the heater current (phase set point) flowing to the first heater 141A such that the amplitude value of the dither signal is less than the target value (Step S70A). Then, the process moves to Step S67A in order for the first output side optical monitor 5A to monitor the optical output power of the optical signal λ1+λ2 received from the first optical multiplexing unit 4A.

When the amplitude value of the dither signal in the first heater control unit 60A is less than the target value (Yes at Step S69A), the first output side optical monitor 5A moves to M4 illustrated in FIG. 17B.

Furthermore, when the designated channel is the second channel at Step S63, the generating unit 8 generates a dither signal at the frequency f1 (Step S64B). The second drive circuit 21B superimposes the dither signal at the frequency f1 onto the second drive current associated with the second channel (Step S65B). Consequently, the second LD 22B emits light of the optical signal λ2 associated with the second channel in accordance with the second drive current in which the dither signal is superimposed. Consequently, the first optical multiplexing unit 4A outputs and transmits the fluctuated optical signal λ1+λ2 at the frequency f1 and the third optical multiplexing unit 4C moves to Step S66A in order to also output and transmit the fluctuated optical signal λ1+λ+λ3+λ4 at the frequency f1.

When the designated channel is the third channel at Step S63, the generating unit 8 generates a dither signal at the frequency f1 (Step S64C). The third drive circuit 21C superimposes the dither signal at the frequency f1 onto the third drive current associated with the third channel (Step S65C). Consequently, the third LD 22C emits light of the optical signal λ3 associated with the third channel in accordance with the third drive current in which the dither signal is superimposed.

The second optical multiplexing unit 4B outputs and transmits the fluctuated optical signal λ3+λ4 at the frequency f1 and the third optical multiplexing unit 4C also outputs and transmits the fluctuated optical signal λ1+λ+λ3+λ4 at the frequency f1 (Step S66B). The second output side optical monitor 5B detects the optical output power of the optical signal λ3+λ4 output from the monitor port 13B of the second optical multiplexing unit 43 (Step S67B). The dither signal detecting unit 61 included in the second heater control unit 60B extracts the amplitude value of the dither signal at the frequency f1 from the optical output power detected by the second output side optical monitor 5B (Step S68B). The comparing unit 62 included in the second heater control unit 60B compares the amplitude value extracted at Step S68B with the target value and determines whether the amplitude value is less than the target value (Step S69B).

When the amplitude value is not less than the target value (No at Step S69B), the current control unit 63 included in the second heater control unit 60B adjusts the heater current (phase set point) flowing to the second heater 141B such that the amplitude value of the dither signal is less than the target value (Step S70B). Then, the process proceeds to Step S67B in order for the second output side optical monitor 5B to monitor the optical output power received from the second optical multiplexing unit 4B.

When the amplitude value of the dither signal in the second heater control unit 60B is less than the target value (Yes at Step S69B), the third output side optical monitor 5C moves to M4 illustrated in FIG. 17B.

Furthermore, when the designated channel is the fourth channel at Step S63, the generating unit 8 generates a dither signal at the frequency f1 (Step S64D). The fourth drive circuit 21D superimposes the dither signal at the frequency f1 onto the fourth drive current associated with the fourth channel (Step S65D). Consequently, the fourth LD 22D emits light of the optical signal associated with the fourth channel in accordance with the fourth drive current in which the dither signal is superimposed. Consequently, the second optical multiplexing unit 4B outputs and transmits the fluctuated optical signal λ3+λ4 at frequency f1 and the third optical multiplexing unit 4C moves to Step S66B in order to also output and transmit the fluctuated optical signal λ1+λ+λ3+λ4 at the frequency f1.

When the amplitude value of the dither signal in the first heater control unit 60A is less than the target value (Yes at Step S69A), the third output side optical monitor 5C detects the optical output power of the optical signal λ1+λ+λ3+λ4 output from the monitor port 13B of the third optical multiplexing unit 4C (Step S71). When the amplitude value of the dither signal in the second heater control unit 60B is less than the target value (Yes at Step S69B), the third output side optical monitor 5C moves to Step S71.

The dither signal detecting unit 61 included in the third heater control unit 60C extracts the amplitude value of the dither signal at the frequency f1 from the optical output power detected by the third output side optical monitor 5C (Step S72). The comparing unit 62 included in the third heater control unit 60C sequential compares the amplitude value of each of the dither signals extracted at Step S72 with the target value of each of the dither signals and determines whether the amplitude value of each of the dither signals is less than the target value (Step S73).

When the amplitude value of each of the dither signals is not less than the target value (No at Step S73), the current control unit 63 included in the third heater control unit 60C adjusts the heater current (phase set point) flowing to the third heater 141C (Step S74). Namely, the current control unit 63 adjusts the heater current (phase set point) flowing to the third heater 141C such that the amplitude value of the dither signal is less than the target value. Then, the process moves to Step S71 in order for the third output side optical monitor 5C to monitor the optical output power received from the third optical multiplexing unit 4C.

When the amplitude value of each of the dither gals in the third heater control unit 60C is less than the target value (Yes at Step S73), the third heater control unit 60C determines whether an undesignated channel is present (Step S75). When an undesignated channel is present (Yes at Step S75), the third heater control unit 60C designates a next channel (Step S76) and moves to Step S63 of M5 illustrated in FIG. 17A. When an undesignated channel is not present (No at Step S75), the third heater control unit 60C ends the fourth optimization process illustrated in FIG. 17B.

The optical transmission device 1D according to the fifth embodiment superimposes the dither signals at the same frequency onto all of the channels and adjusts the heater current (phase set point) of the heater 141 associated with each of the channels such that the amplitude values of each of the dither signals associated with all of the channels are less than the target value. Namely, the optical transmission device 1D adjusts the phase difference in the Mach-Zehnder unit 12 such that the amplitude value of each of the dither signals is less than the target value. Consequently, by adjusting the temperature of the heaters 141 associated with all of the channels and by adjusting the refractive index of each of the optical waveguides included in the Mach-Zehnder unit 12, it is possible to stabilize the optical output power of each of the channels by appropriately controlling the optical multiplexing filters 4 associated with all of the channels even when part variations or manufacturing variations are present. Furthermore, it is possible to reduce a processing load because the generating unit 8 only needs to generate the dither signals at a single frequency.

Furthermore, in the optical transmission device 1 according to the first to the fifth embodiments, the optical sending device in a 4-wavelength multiplexing system has been exemplified; however, it may also be applicable for an optical receiving device that uses the 4-wavelength multiplexing system. Furthermore, in the optical transmission device 1 according to the first to the fifth embodiments, the 4-wavelength multiplexing system has been exemplified; however, the embodiment is not limited to four wavelengths, any system may also be used as long as a plurality of wavelengths are multiplexed, and furthermore, modifications are possible as needed.

Furthermore, for convenience of description, it has been described of a case as an example in which the delay unit 14 and the heating unit 141 are used as the adjusting units; however, any adjusting unit may also be used as long as the adjusting unit has a function for adjusting the phase of each of the optical signals associated with the two optical waveguides, and furthermore, modifications are possible as needed.

Furthermore, it has been described of a case as an example in which the phase of each of the optical signals passing through the two optical waveguides is adjusted by adjusting the heater current of the heating unit 141; however, the embodiment is not limited to this. It may also be possible to adjust the phase of the transmission spectrum of the optical multiplexing unit 4, and furthermore, modifications are possible as needed.

Furthermore, the heating unit 141 that adjusts the phases of the optical signals passing through the two optical waveguides by adjusting the heater current described in the embodiments has been described as an example of an adjusting unit; however, the adjusting unit is not limited to the heating unit, and furthermore, modifications are possible as needed.

Each of the components in the units illustrated in the drawings is not always physically configured as illustrated in the drawings. In other words, the specific shape of a separate or integrated unit is not limited to the drawings; however, all or part of the unit can be configured by functionally or physically separating or integrating any of the units depending on various kinds of loads or use conditions.

Furthermore, all or any part of various processing functions performed by each unit may also be executed by a central processing unit (CPU) (or a microcomputer, such as a micro processing unit (MPU), a micro controller unit (MCU), or the like). Furthermore, all or any part of various processing functions may also be, of course, executed by programs analyzed and executed by the CPU (or the microcomputer, such as the MPU or the MCU), or executed by hardware by wired logic.

According to an aspect of an embodiment, it is possible to stably output optical output power of a plurality of channels.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
   a first detector that detects optical output power of an optical signal for each channel for input to a Mach-Zehnder unit that has asymmetric optical waveguides;
   a generator that superimposes, based on the optical output power for each of the channels detected by the first detector, a dither signal onto an optical signal in a specific channel from among the plurality of channels for input to the Mach-Zehnder unit;
   a second detector that detects an amplitude value of the dither signal that is superimposed onto the optical signal in the specific channel and that is output from the Mach-Zehnder unit; and
   a controller that adjusts a phase difference in the Mach-Zehnder unit such that the amplitude value of the dither signal superimposed onto the optical signal in the specific channel detected by the second detector is less than a predetermined threshold.

2. The optical transmission device according to claim 1, wherein the generator superimposes the dither signal onto a drive current that drives a light emitter that emits light of the optical signal in the specific channel.

3. The optical transmission device according to claim 1, wherein the generator superimposes the dither signal onto a modulated signal in a modulator that modulates the optical signal in the specific channel.

4. The optical transmission device according to claim 1, further comprising a processor configured to specify, based on the optical output power for each of the channels detected by the first detector, an order of magnitude the optical output power of each of the channels, wherein
   the generator superimposes, based on the order specified by the processor, the dither signal onto the optical signal in the specific channel from among the plurality of channels for input to the Mach-Zehnder unit.

5. The optical transmission device according to claim 4, wherein the generator superimposes the dither signal onto the optical signal in the specific channel corresponding to an optical signal in a channel in which the optical output power is the minimum in the order specified by the processor.

6. The optical transmission device according to claim 4, wherein the generator sequentially superimposes, based on the order, a dither signal at the same frequency onto the optical signal for each of the channels.

7. The optical transmission device according to claim 4, wherein the generator sequentially superimposes, based on the order, dither signals at different frequencies for each of the channels onto the optical signal for each of the channels.

8. An optical multiplexer comprising:
   a first detector that detects optical output power of an optical signal for each channel for input to a Mach-Zehnder unit that has asymmetric optical waveguides;
   a generator that superimposes, based on the optical output power for each of the channels detected by the first detector, a dither signal onto an optical signal in a specific channel from among the plurality of channels for input to the Mach-Zehnder unit;
   a second detector that detects an amplitude value of the dither signal that is superimposed onto the optical signal in the specific channel and that is output from the Mach-Zehnder unit; and
   a controller that adjusts a phase difference in the Mach-Zehnder unit such that the amplitude value of the dither signal superimposed onto the optical signal in the specific channel detected by the second detector is less than a predetermined threshold.

9. An optical transmission method comprising:
   detecting optical output power of an optical signal for each channel for input to a Mach-Zehnder unit that has asymmetric optical waveguides;
   superimposing, based on the detected optical output power for each of the channels, a dither signal onto an optical signal in a specific channel from among the plurality of channels for input to the Mach-Zehnder unit;
   detecting an amplitude value of the dither signal that is superimposed onto the optical signal in the specific channel and that is output from the Mach-Zehnder unit; and
   adjusting a phase difference in the Mach-Zehnder unit such that the amplitude value of the dither signal superimposed onto the detected optical signal in the specific channel is less than a predetermined threshold.

* * * * *